US009522329B2

(12) United States Patent
Yamamoto et al.

(10) Patent No.: US 9,522,329 B2
(45) Date of Patent: Dec. 20, 2016

(54) GAME SYSTEM, CONTROL METHOD, AND A STORAGE MEDIUM STORING A COMPUTER PROGRAM USED THEREOF

(75) Inventors: Takao Yamamoto, Minato-ku (JP); Shota Katagiri, Minato-ku (JP); Masahiro Kiyomoto, Minato-ku (JP); Mayumi Okuyama, Minatu-ku (JP); Yoshitaka Nishimura, Minato-ku (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 953 days.

(21) Appl. No.: 13/702,500

(22) PCT Filed: Jun. 10, 2011

(86) PCT No.: PCT/JP2011/063410
§ 371 (c)(1),
(2), (4) Date: Dec. 6, 2012

(87) PCT Pub. No.: WO2011/155611
PCT Pub. Date: Dec. 15, 2011

(65) Prior Publication Data
US 2013/0079137 A1    Mar. 28, 2013

(30) Foreign Application Priority Data

Jun. 10, 2010    (JP) .................................. 2010-133438

(51) Int. Cl.
*A63F 9/24*        (2006.01)
*A63F 13/00*       (2014.01)
(Continued)

(52) U.S. Cl.
CPC ........... *A63F 13/5375* (2014.09); *A63F 13/44* (2014.09); *A63F 13/2145* (2014.09); *A63F 13/54* (2014.09);
(Continued)

(58) Field of Classification Search
CPC ...... A63F 13/44; A63F 13/54; A63F 13/2145; A63F 13/5375; A63F 2300/638; A63F 2300/646; A63F 2300/1075; A63F 2300/8011; A63F 2300/8047
(Continued)

(56) References Cited

U.S. PATENT DOCUMENTS

2005/0202869 A1    9/2005    Miyamoto et al.
2005/0208993 A1    9/2005    Yoshizawa et al.
(Continued)

FOREIGN PATENT DOCUMENTS

JP    2000-155543 A    6/2000
JP    3579042 B1       10/2001
(Continued)

OTHER PUBLICATIONS

Korean Office Action with English Translation—Date of Issue Feb. 21, 2014.
(Continued)

*Primary Examiner* — Omkar Deodhar
*Assistant Examiner* — Wei Lee
(74) *Attorney, Agent, or Firm* — Howard & Howard Attorneys PLLC

(57) ABSTRACT

A gaming system is provided with a monitor (3) for displaying and outputting a gaming screen (50), a touch panel (5) superposed upon the monitor (3), and an external storage device (20) for storing sequence data (28) in which operational periods of the touch panel (5) have been described. In addition, the gaming system displays on the monitor (3) a gaming area (52) whereon two reference units (55A and 55B) disposed apart from each other and a specific reference unit (55T) disposed in the vicinity of the reference units are set. Also, an object (60) for instructing operations for each of the reference units (55A, 55B, and 55T) is displayed while being caused to move in the gaming area (52), and the path of movement of a specific object (60S) heading toward the specific reference unit (55T) is restricted to a fixed path.

14 Claims, 12 Drawing Sheets

(51) Int. Cl.
*G06F 17/00* (2006.01)
*G06F 19/00* (2011.01)
*A63F 13/5375* (2014.01)
*A63F 13/44* (2014.01)
*A63F 13/2145* (2014.01)
*A63F 13/54* (2014.01)

(52) U.S. Cl.
CPC .. *A63F 2300/1075* (2013.01); *A63F 2300/638* (2013.01); *A63F 2300/646* (2013.01); *A63F 2300/8011* (2013.01); *A63F 2300/8047* (2013.01)

(58) Field of Classification Search
USPC .......................................................... 463/31
See application file for complete search history.

(56) References Cited

U.S. PATENT DOCUMENTS

| | | | |
|---|---|---|---|
| 2005/0215323 | A1* | 9/2005 | Miyamoto et al. ............. 463/43 |
| 2007/0232374 | A1* | 10/2007 | Lopiccolo .............. G10H 1/342 463/7 |

FOREIGN PATENT DOCUMENTS

| | | |
|---|---|---|
| JP | 2003-236243 A | 8/2003 |
| JP | 2004-298281 A | 10/2004 |
| KR | 10-2006-0043866 | 5/2006 |
| TW | M370425 U1 | 12/2009 |

OTHER PUBLICATIONS

International Search Report (Date of Mailing Sep. 13, 2011).
Chinese Office Action with English Translation—Issued: Jul. 3, 2014.
Chinese Office Action with English Translation (Issued Mar. 5, 2013).

\* cited by examiner

GAME SYSTEM, CONTROL METHOD, AND A STORAGE MEDIUM STORING A COMPUTER PROGRAM USED THEREOF

CROSS REFERENCE TO RELATED APPLICATION

This application is a national stage application of PCT/JP2011/063410, filed Jun. 10, 2011, which claims priority to Japanese Patent Application No. 2010-133438, filed Jun. 10, 2010, the disclosures of which are hereby incorporated by reference in their entirety.

TECHNICAL FIELD

The present invention relates to a game system in which an operation timing of an operating unit provided in an input device is indicated through a game screen, a control method, and a storage medium storing a computer program used thereof.

BACKGROUND ART

There are game machines in which a plurality of players alternately operates an operating unit in tune with a rhythm of music. Of the game machines, there has been known a game machine in which a plurality of players plays a game, and each player alternately operates an operating unit while deciding a next player to operate an operating unit through an operation of an operating unit (for example, see Patent Literature 1). As an example of prior art documents relevant to the present invention, in addition to the Patent Literature 1, patent Literature 2 also exists.

Patent Literature 1: Japanese Patent Application Laid-Open (JP-A) No. 2003-236243 and Patent Literature 2: JP-A No. 2000-155543.

SUMMARY OF INVENTION

Technical Problem

In the game machine disclosed in Patent Literature 1, light shots serving as operation indication marks to indicate an operation timing of an operating unit move toward a control area serving as a reference portion. Further, the light shots move along a path continuously connected to connect control areas with each other. However, when a timing at which an operation indication mark arrives at a reference portion is indicated, if a moving path of an operation indication mark is limited to the continuously connected path, various kinds of restrictions occur. For example, as the various kinds of restrictions, there are restrictions such as a restriction of a moving velocity associated with restricting a distance to a next reference portion, or a restriction that a game becomes monotonous when a moving velocity is extremely reduced.

In this regard, it is an object of the present invention to provide a game system, a control method, and a storage medium storing a computer program used thereof, which are capable of increasing a degree of freedom in an appearance position or an appearance timing of an operation indication mark.

Solution to Problem

A game system of the present invention comprises: a display device that displays and outputs a game screen; an input device including at least one operating unit; a sequence data storage device that stores sequence data in which an operation timing of the operating unit during a game is described together with information associated with each operation timing; a game region presenting device that causes a game region in which a plurality of reference portions arranged apart from each other are set to be displayed on the game screen; a mark display control device that displays each operation indication mark for indicating an operation on the operating unit such that the operation indication mark arrives at least one of the plurality of reference portions along any one of a plurality of paths connecting the reference portions at an operation timing indicated by the sequence data, and a next operation indication mark having a correspondence relation with a certain operation indication mark moves along a path continuously connected with a moving path of the certain operation indication mark among the plurality of paths based on information described in the sequence data, and a position change device that causes the certain operation indication mark to disappear from the game screen after the operation timing elapses and changes the moving path of the next operation indication mark from the path continuously connected with the moving path of the certain operation indication mark to a path extending from a predetermined position when a predetermined condition is satisfied.

According to the present invention, when a predetermined condition is satisfied, the moving path of the next operation indication mark is changed from the path having continuity with the moving path of the certain operation indication mark to the path extending from a predetermined position. Thus, when a predetermined condition is satisfied, a restriction of a moving path is mitigated. As a result, compared to when the moving path of the operation indication mark is limited to the path having continuity with the moving path of the certain operation indication mark, it is possible to increase a degree of freedom in an appearance position or an appearance timing of a next operation indication mark. Further, since a degree of freedom in an appearance position of an operation indication mark or the like is increased, a rendering width of the game can be increased, and thus amusement of the game can be improved.

Various kinds of conditions may be employed as the predetermined condition. For example, in an aspect of the game system according to the present invention, the game system may further comprises a velocity calculating device that calculates a moving velocity of the operation indication mark based on a distance from an appearance position of the operation indication mark set in the game screen to an arrival position and an operation timing indicated in the sequence data, and wherein the position change device may determine whether or not the predetermined condition has been satisfied based on the moving velocity of the certain operation indication mark calculated by the velocity calculating device.

In the aspect in which the position change device uses the moving velocity of the certain operation indication mark for the determination of the predetermined condition, the position change device may determine that the predetermined condition has been satisfied when the moving velocity of the certain operation indication mark calculated by the velocity calculating device does not fall within a predetermined range. In this case, for example, it is possible to suppress a phenomenon that the moving velocity of the next operation indication mark corresponding to the next operation timing becomes too slow due to the relation between the next operation timing and the moving path and a game becomes monotonous. Further, on the contrary, it is possible to suppress a phenomenon that a moving velocity of an operation indication mark becomes fast as it is inappropriate to an indication of an operation.

In the aspect in which the position change device uses the moving velocity of the certain operation indication mark for the determination of the predetermined condition, the position change device may determine that the predetermined condition has been satisfied when a velocity difference between the moving velocity of the certain operation indication mark calculated by the velocity calculating device and the moving velocity of the next operation indication mark exceeds a predetermined range. In this case, it is possible to suppress that the velocity difference between before and after an arrival at a reference portion becomes remarkable as it is inappropriate to an indication of an operation.

Further, for example, as an aspect of the predetermined condition, the game region presenting device may cause a game region, in which there is a predetermined distance between the plurality of reference portions and at least one specific reference portion is set as a part of the plurality of reference portions at a position at which a distance between the position and other reference portions is different from the predetermined distance, to be displayed on the game screen as the game region, and the position change device may determine whether or not the predetermined condition has been satisfied based on a specific operation indication mark that moves so as to arrive at the specific reference portion among the plurality of reference portions at the operation timing indicated by the sequence data. Further, in this aspect, the game region presenting device may cause a game region, in which the specific reference portion is set at a position at which a distance from at least one reference portion of the plurality of reference portions is closer than a distance from reference portions other than the one reference portion, to be displayed on the game screen as the game region. In this case, since it is possible to cause a deviation in a distance between the specific reference portion and other reference portions, the deviation in the distance can be used as information representing a relation between the specific reference portion and other reference portions. Furthermore, in this aspect, the game region presenting device may cause a game region, in which the specific reference portion is set as the closer position at a position at which a distance from at least one other reference portion excluding a reference portion arranged at the closer position is shorter than the predetermined distance, to be displayed on the game screen as the game region.

The position change device may use any position as the predetermined position. For example, in the aspect in which the specific reference portion is arranged near a certain reference portion, the position change device may use an inside of a region formed between the specific reference portion and the reference portion arranged at the closer position as the predetermined position.

Further, for example, as an aspect of the predetermined condition, the position change device may determine that the predetermined condition has been satisfied when the specific operation indication mark is displayed as the certain operation indication mark and an operation has not been executed on the operating unit within a certain range based on an operation timing to be indicated by the specific operation indication mark. In this case, a path can be changed according to the presence or absence of execution of an operation corresponding to an operation timing indicated by the specific operation indication mark. Further, for example, when the specific reference portion and other reference portions other than the specific reference portion are arranged in order in a moving direction of the specific operation indication mark, it is possible to prevent further arrival of an operation indication mark which has indicated an operation timing through the specific reference portion at another reference portion. Thus, induction of an erroneous operation can be suppressed.

The game region may have various shapes. For example, in an aspect of the game system according to the present invention, the game region presenting device may cause a region, which is formed in the form of a quadrangle and includes two reference portions extending in the form of a straight line which are set at both one ends of the quadrangle so as to face each other, to be displayed on the game screen as the game region.

Various input devices may be used as the input device. For example, in an aspect of the game system according to the present invention, a touch panel arranged on the display device so as to cover the game region may be used as the input device.

In an aspect of the game system according to the present invention, the game system may further comprise an evaluating device that evaluates an operation in at least one of the plurality of reference portions based on a timing of an operation on the operating unit and an operation timing designated by the sequence data. In this case, a timing of an operation on the operating unit can be evaluated based on an operation timing described in the sequence data. Thus, amusement of a game can be further improved.

In an aspect of the game system according to the present invention, the game system may further comprise: an audio output device that reproduces and outputs a sound; a music data storage device that stores music data used to reproduce music, and a music reproducing device that reproduces the music through the audio output device based on the music data, and wherein an operation timing of the operating units during reproduction of the music may be described in the sequence data. In this case, a music game in which an operation indication mark moves so as to arrive at least one reference portion at an operation timing corresponding to a rhythm of music can be actualized.

A control method of the present invention is a control method of controlling a computer incorporated into a game system comprising: a display device that displays and outputs a game screen; an input device including at least one operating unit; a sequence data storage device that stores sequence data in which an operation timing of the operating unit during a game is described together with information associated with each operation timing, and wherein the control method of controlling the computer comprises the steps: a game region presenting step that causes a game region in which a plurality of reference portions arranged apart from each other are set to be displayed on the game screen; a mark display control step that displays each operation indication mark for indicating an operation on the operating unit such that the operation indication mark arrives at least one of the plurality of reference portions along any one of a plurality of paths connecting the reference portions at an operation timing indicated by the sequence data, and a next operation indication mark having a correspondence relation with a certain operation indication mark moves along a path continuously connected with a moving path of the certain operation indication mark among the plurality of paths based on information described in the sequence data, and a position change step that causes the certain operation indication mark to disappear from the game screen after the operation timing elapses and changes the moving path of the next operation indication mark from the path continuously connected with the moving path of the certain operation indication mark to a path extending from a predetermined position when a predetermined condition is satisfied.

Further, a storage medium storing a computer program for a game system of the present invention is a storage medium storing a computer program for a game system comprising: a display device that displays and outputs a game screen; an input device including at least one operating unit; a sequence data storage device that stores sequence data in which an operation timing of the operating unit during a game is described together with information associated with each operation timing, and wherein the computer program is configured so as to cause a computer incorporated into the game system to function as: a game region presenting device that causes a game region in which a plurality of reference portions arranged apart from each other are set to be displayed on the game screen; a mark display control device that displays each operation indication mark for indicating an operation on the operating unit such that the operation indication mark arrives at least one of the plurality of reference portions along any one of a plurality of paths connecting the reference portions at an operation timing indicated by the sequence data, and a next operation indication mark having a correspondence relation with a certain operation indication mark moves along a path continuously connected with a moving path of the certain operation indication mark among the plurality of paths based on information described in the sequence data, and a position change device that causes the certain operation indication mark to disappear from the game screen after the operation timing elapses and changes the moving path of the next operation indication mark from the path continuously connected with the moving path of the certain operation indication mark to a path extending from a predetermined position when a predetermined condition is satisfied. It is possible to actualize the game system of the present invention by executing the control method of controlling the computer and the computer program for the game system of the present invention.

Advantageous Effects of Invention

As described above, according to the present invention, it is possible to increase a degree of freedom of an appearance position or an appearance timing of an operation indication mark.

DESCRIPTION OF EMBODIMENTS

Figure 1:
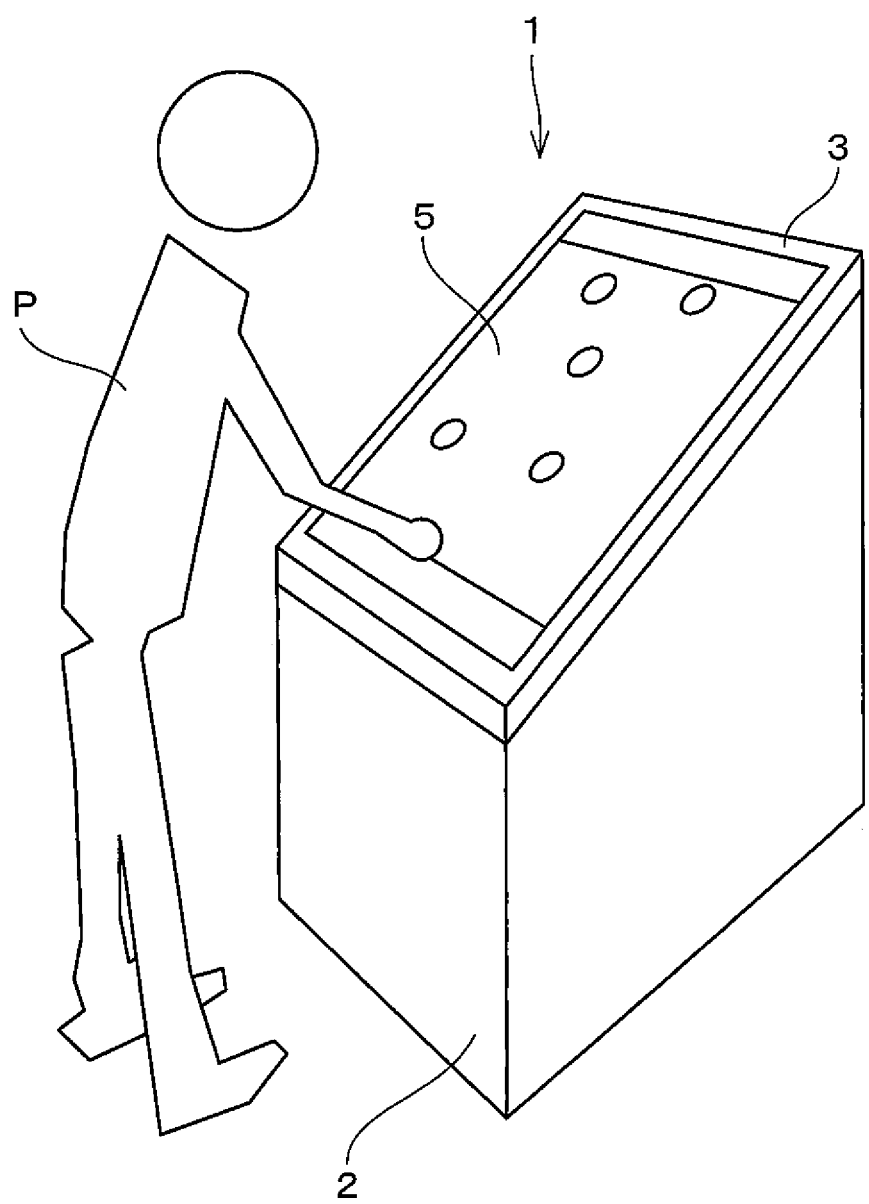
FIG. 1 is a diagram illustrating a game machine for business use to which a game system according to an embodiment of the present invention is applied.

Hereinafter, an embodiment of a game system according to the present invention will be described. FIG. 1 is a diagram illustrating a game machine for business use to which a game system according to an embodiment of the present invention is applied. As illustrated in FIG. 1, a game machine 1 includes a casing 2, and a monitor 3 arranged, obliquely toward a player P side, on the top surface of the casing 2. A transparent touch panel 5 is superimposed on the surface of the monitor 3. The touch panel 5 is a known input device that outputs a signal corresponding to a contact position when the player P contacts the touch panel 5 with his/her finger or the like. In addition, the game machine 1 includes various kinds of input devices and output devices provided in a typical game machine for business use such as a button used to make a selection or a decision, a power switch, a volume operation switch, and a power lamp, which are not illustrated in FIG. 1.

Figure 2:
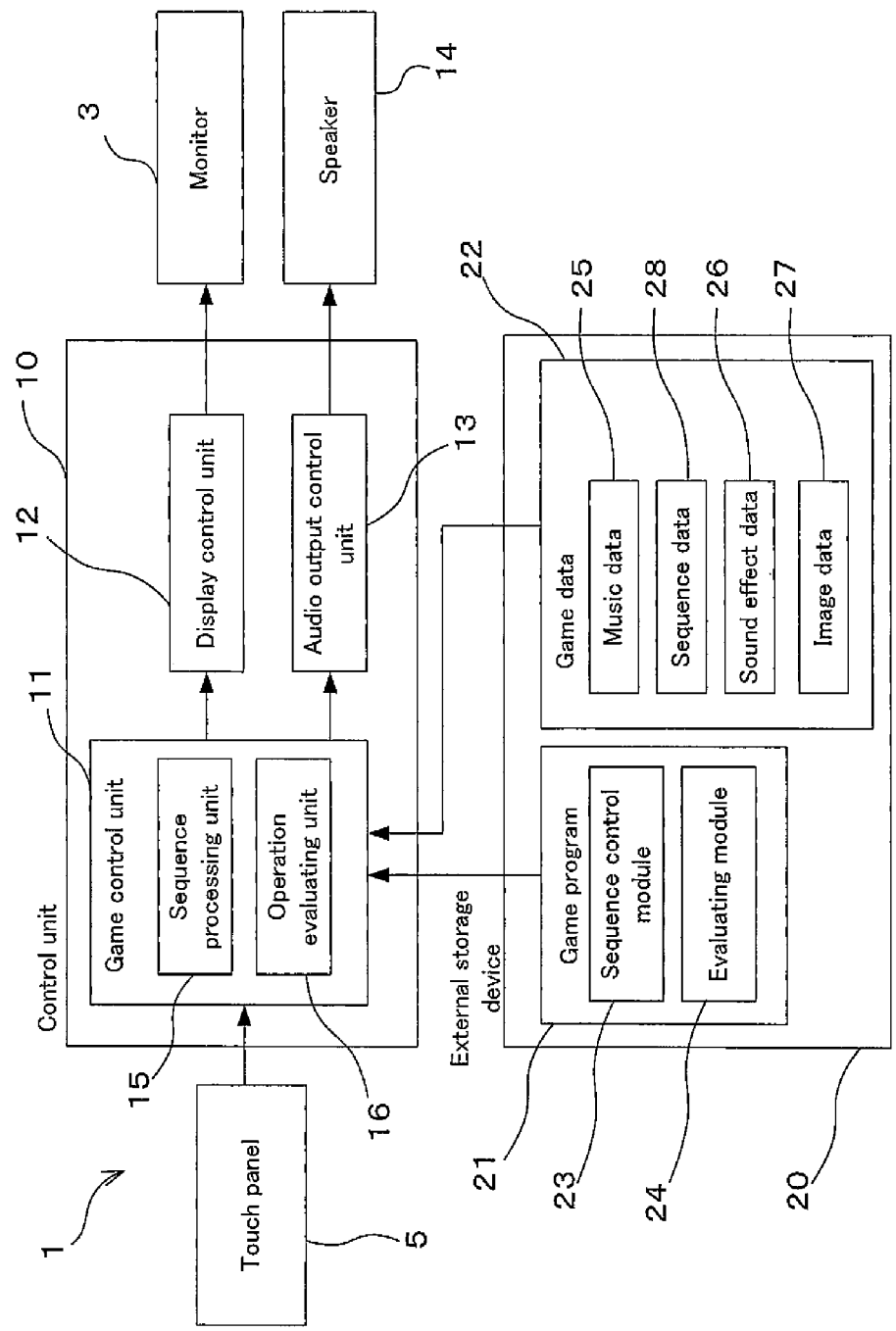
FIG. 2 is a functional block diagram of a game machine.

FIG. 2 is a functional block diagram of the game machine 1. As illustrated in FIG. 2, a control unit 10 serving as a computer is provided in the casing 2. The control unit 10 includes a game control unit 11 serving as a control host, a display control unit 12 and an audio output control unit 13 which operate according to an output from the game control unit 11. The game control unit 11 is configured as a unit in which a microprocessor is combined with various kinds of peripheral devices such as an internal storage device (for example, a read only memory (ROM) or a random access memory (RAM)) necessary for an operation of the microprocessor. The display control unit 12 causes a predetermined image to be displayed on the monitor 3 by rendering an image corresponding to image data provided from the game control unit 11 in a frame buffer and then outputting a video signal corresponding to the rendered image to the monitor 3. The audio output control unit 13 causes a predetermined sound (including music or the like) to be reproduced from a speaker 14 by generating an audio reproduction signal corresponding to audio reproduction data provided from the game control unit 11 and then outputting the generated audio reproduction signal to the speaker 14.

The game control unit 11 is connected with an external storage device 20. As the external storage device 20, there is used a storage medium in which data remains stored even when power is not supplied such as an optical storage medium including a digital versatile disc-read only memory (DVD-ROM), a compact disc-read only memory (CD-ROM) or the like, or a non-volatile semiconductor memory device including an electrically erasable programmable read-only memory (EEPROM) or the like.

A game program 21 and game data 22 are stored in the external storage device 20. The game program 21 is a computer program necessary for the game machine 1 to execute a music game according to a predetermined procedure, and includes a sequence control module 23 and an evaluating module 24 in order to actualize a function according to the present invention. When the game machine 1 is activated, the game control unit 11 executes various kinds of initial settings necessary to operate as the game machine 1 by executing an operation program stored in an internal storage device thereof, and then sets an environment in which a music game is executed according to the game program 21 by reading the game program 21 from the external storage device 20 and executing the game program 21. When the sequence control module 23 of the game program 21 is executed by the game control unit 11, a sequence processing unit 15 is generated in the game control unit 11. Further, when the evaluating module 24 of the game program 21 is executed by the game control unit 11, an operation evaluating unit 16 is generated in the game control unit 11. The sequence processing unit 15 and the operation evaluating unit 16 are logical devices actualize by a combination of computer hardware and a computer program. The sequence processing unit 15 executes music game processes such as a process of instructing the player to make an operation in tune with reproduction of music (music composition) selected by the player or generating a sound effect in response to the player's operation. The operation evaluating unit 16 executes processes such as a process of evaluating the player's operation and then controlling the game based on an evaluation result. Incidentally, the game program 21 includes various kinds of program modules necessary to execute a music game in addition to the modules 23 and 24, and logical devices corresponding to the modules are generated in the game control unit 11 although not illustrated.

The game data 22 includes various pieces of data to be referred to when a music game is executed according to the game program 21. For example, the game data 22 includes music data 25, sound effect data 26, and the image data 27. The music data 25 refers to data necessary for reproducing and outputting music which is a target of the game from the speaker 14. FIG. 2 illustrates a single kind of music data 25, but the player can actually select music to be played from among a plurality of pieces of music. In the game data 22, one or more pieces of music data 25 are recorded in association with information identifying each piece of music. The sound effect data 26 is data in which each of one or more types of sound effects to be output from the speaker 14 in response to the player's operation is recorded in association with a unique code for each of the sound effects. Sounds of musical instruments and various kinds of sounds are included as the sound effect. Pieces of sound effect data which are equal in number to a predetermined octave number and have different musical pitches according to the kind may be prepared. The image data 27 is data used to cause a background image, various kinds of objects or icons, and the like in a game screen to be displayed on the monitor 3.

The game data 22 further includes sequence data 28. The sequence data 28 is data used to define an operation to be indicated to the player. At least a piece of sequence data 28 is prepared for single music data. The details of the sequence data 28 will be described later.

Figure 3:
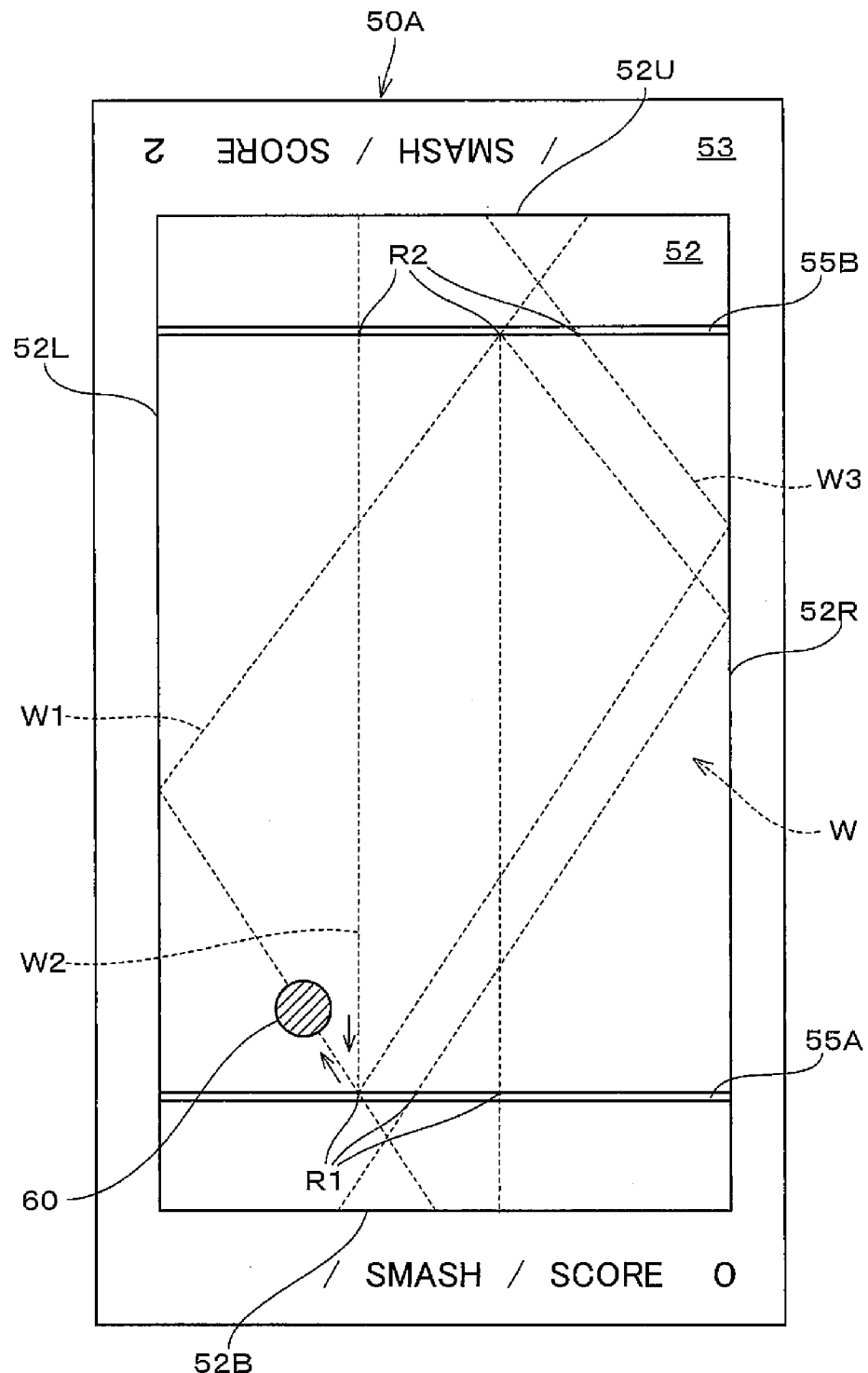
FIG. 3 is a diagram schematically illustrating a game screen.

Next, an outline of a music game executed by the game machine 1 will be described. The game machine 1 is configured as a music game machine of a match-up type in which the two players execute an operation in tune with music (including a case in which the game machine 1 functions as the other player) and the operation timings of two players are evaluated. FIG. 1 illustrates only one game machine, but the game may be played through a plurality of game machines 1 connected so as to share the game situation. FIG. 3 is a diagram schematically illustrating a game screen. The game screen 50 includes a game region 52 used to guide an operation timing to the player and an information region 53 used to display a score and the like of each player. The game region 52 has a rectangular shape. A first reference portion 55A and a second reference portion 55B serving as reference portions are arranged at both ends of the game region 52 in a longitudinal direction so as to face each other. Each of the reference portions 55A and 55B extends in the form of a straight line in a direction orthogonal to the longitudinal direction of the game region 52.

Each of the reference portions 55A and 55B is used as a reference of a current time on the game by a player of the game. Specifically, the first reference portion 55A is used as a reference of a current time of a first player, and the second reference portion 55B is used as a reference of a current time of a second player. At each reference portion 55A or 55B, different colors for each player are used for identifying each player. In the example of FIG. 3, a red straight line is used as the first reference portion 55A, and a blue straight line is used as the second reference portion 55B. Further, the information region 53 is arranged around the game region 52. One end side of the game region 52 in the longitudinal direction is used for displaying a score and the like of one player, and the other end side thereof is used for displaying a score and the like of the other player.

Further, each of the reference portions 55A and 55B includes a plurality of rebounding points arranged at predetermined intervals. A plurality of rebounding points R1 included in the first reference portion 55A are connected with a plurality of rebounding points R2 included in the second reference portion through a plurality of paths W, respectively. Specifically, provided are a plurality of paths W that reach from one rebounding point R1 of the first reference portion 55A to a plurality of rebounding points R2 included in the second reference portion 55B, and similarly, a plurality of paths W that reach from one rebounding point R2 of the second reference portion 55B to a plurality of rebounding points R1 included in the first reference portion 55A. A plurality of paths W extending from the rebounding point R1 of the first reference portion 55A extend up to the upper end portion 52U at the second reference portion 55B side while passing the rebounding point R2. Further, a plurality of paths W extending from the rebounding point R2 of the second reference portion 55B extend up to the lower end portion 52B at the first reference portion 55A side while passing the rebounding point R1. In the example of FIG. 3, all of a plurality of paths W are indicated by dashed lines. As illustrated in FIG. 3, in this example, three paths W1, W2, and W3 extending from the rebounding point R1 toward the three rebounding points R2 included in the second reference portion 55B are set to a certain rebounding point R1 of the first reference portion 55A as a plurality of paths W. During execution of a music game, that is, during the progress of reproduction of music, the object 60 serving as the operation indication mark indicating an operation is displayed on the path W connecting the rebounding point R1 with the rebounding point R2 according to the sequence data 28. Incidentally, in FIG. 3, for convenience of description, the paths W1, W2, and W3 are indicated by the dashed lines, but any of a plurality of paths W is not displayed on the actual game screen 50A.

The object 60 appears at the rebounding point R1 or the rebounding point R2 at an appropriate timing in music, and then moves along the path W extending from the rebounding point R1 or R2 at the appearance position from one of the rebounding points R1 and R2 at the appearance position toward the other of the rebounding points R1 and R2 positioned at the opposite side according to the progress of the music. Then, when an appropriate operation is executed in tune with an arrival of the object 60, the object 60 disappears. In tune with the disappearance of the object 60, a next object 60 appears on the rebounding point R1 or R2 of the reference portion 55A or 55B on which an appropriate operation has been made. In other words, the arrival position of the object 60 serves as the appearance position of the next object 60. The object 60 that appears at the appearance position moves toward the rebounding point R1 or R2 positioned at the opposite side from the appearance position. For this reason, when an appropriate operation is made, the object 60 alternately and repeatedly moves between the reference portions 55A and 55B as if the object 60 rebounds from the rebounding points R1 and R2. Meanwhile, when an appropriate operation is not made, the object 60 passes through the reference portion 55A or 55B along each path W and so moves up to an upper end portion 52U or a lower end portion 52B. And, the position of the end portion 52U or 52B at which the object 60 has arrived serves as the appearance position of the next object 60. For this reason, when an appropriate operation is not made, the object 60 changes a moving direction toward the reference portion positioned at the opposite side from the end portion 52U or 52B as if the object 60 rebounded from the end portion 52U or 52B.

As an appropriate operation, each player is required to perform a touch operation of touching the position of the reference portion 55A or 55B at which the object 60 has arrived in tune with an arrival of the object 60 at the reference portion 55A or 55B. When each player performs the touch operation, a time difference between a time when the object 60 matches each of the reference portions 55A and 55B and a time when each player has performed the touch operation is detected. The smaller the time difference is, the higher an operation of the player is evaluated. Further, a sound effect is reproduced from the speaker 14 in response to the touch operation. A well-known method may be used as a method of reproducing the sound effect. For example, as a well-known method of reproducing a sound effect, there is a method of adding a sound effect on music while reproducing the music or a method of reproducing a sound effect corresponding to a misoperation while muting the music when missed. Further, for example, there is also a method in which music is divided in parts, each part is assigned to each operation timing, and a part of the music assigned to the corresponding operation timing is played back when an appropriate operation is executed (a method of forming the music by an appropriate operation at each operation timing. For this reason, when a misoperation is made, a part of the music to which the operation timing is assigned is not reproduced).

In the example of FIG. 3, the object 60 is moving on the path W2 toward the rebounding point R2 of the second reference portion 55B. And, it is preferable that the second player using the second reference portion 55B as the reference of the current time performs the touch operation at the position of the second reference portion 55B at which the object 60 arrives in tune with an arrival at the second reference portion 55B. Further, the object 60 is displayed in color corresponding to the reference portion 55A or 55B of a destination toward which the object 60 is currently moving. In other words, in the example of FIG. 3, the object 60 is displayed in blue until arriving at the rebounding point R2 of the second reference portion 55B, and a next object 60 appearing at the rebounding point R2 at the arrival position is displayed in red. In this embodiment, a plurality of operating units are configured by a combination of each of the reference portions 55A and 55B on the monitor 3 and the touch panel 5 superimposed thereon. Incidentally, in the following, each of the reference portions 55A and 55B may be used as a term representing the operating unit.

Figure 4:
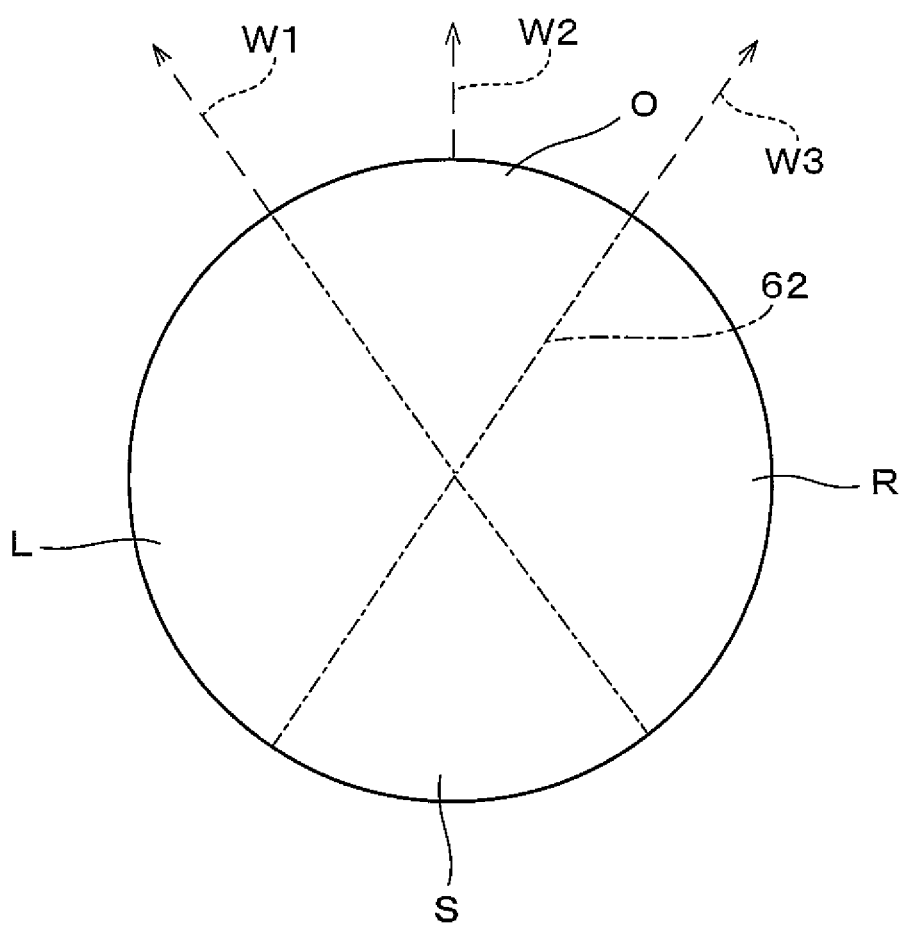
FIG. 4 is a diagram for describing a region of an object.

The path W along which the object 60 moves from one of the rebounding points R1 and R2 at the arrival position to the other of the rebounding points R1 and R2 at the opposite side is decided according to the position of the object 60 when the reference portion 55A or 55B is touched. In order to make a comparison of position easy, the object 60 is divided into a plurality of regions. FIG. 4 is a diagram for describing regions of the object 60. In FIG. 4, dashed lines represent the paths W1, W2, and W3, and an alternate long and short dash line 62 represents the boundary between the regions. In the example of FIG. 4, the object 60 is divided into four regions, that is, a contact region S near a contact point at which the object 60 first comes in contact with the reference portion 55A or 55B, right and left regions R and L that establish the boundary of the contact region S, and the remaining region O. And, as a path along which the object 60 moves, from among the paths W reaching to the rebounding point R1 from the rebounding point R2, the straight line path W2 reaching to the rebounding point R1 at the shortest distance is selected when near the contact region S or the remaining region O (including these regions S and O) is touched, the first right path W3 reaching to the rebounding point R1 through a right side wall 52R of the game region 52 in the longitudinal direction is selected when near the left region L (including the region L) is touched, and the first left path W1 reaching to the rebounding point R1 through a left side wall 52L of the game region 52 in the longitudinal direction is selected when near the right region R (including the region R) is touched. In other words, the moving path used when the object 60 moves to the reference portion 55A or 55B of the next destination is decided according to a positional relation between an operation position of the touch operation and the position of the object 60. Since the moving distance differs according to the moving path, the moving distance along which the object 60 moves to the reference portion 55A or 55B of the next destination differs according to the positional relation between the operation position and the position of the object 60. Meanwhile, an operation timing to touch the object 60, that is, a timing at which the object 60 arrives at each of the reference portions 55A and 55B is constant regardless of the moving path. For this reason, the moving velocity of the object 60 differs according to the moving path. In other words, the path W and the moving velocity of the object 60 that moves toward one player change according to the other player's touch operation. Since this changes a difficulty level of a game, each player executes his/her operation while being conscious of influence of the other player.

Figure 5:
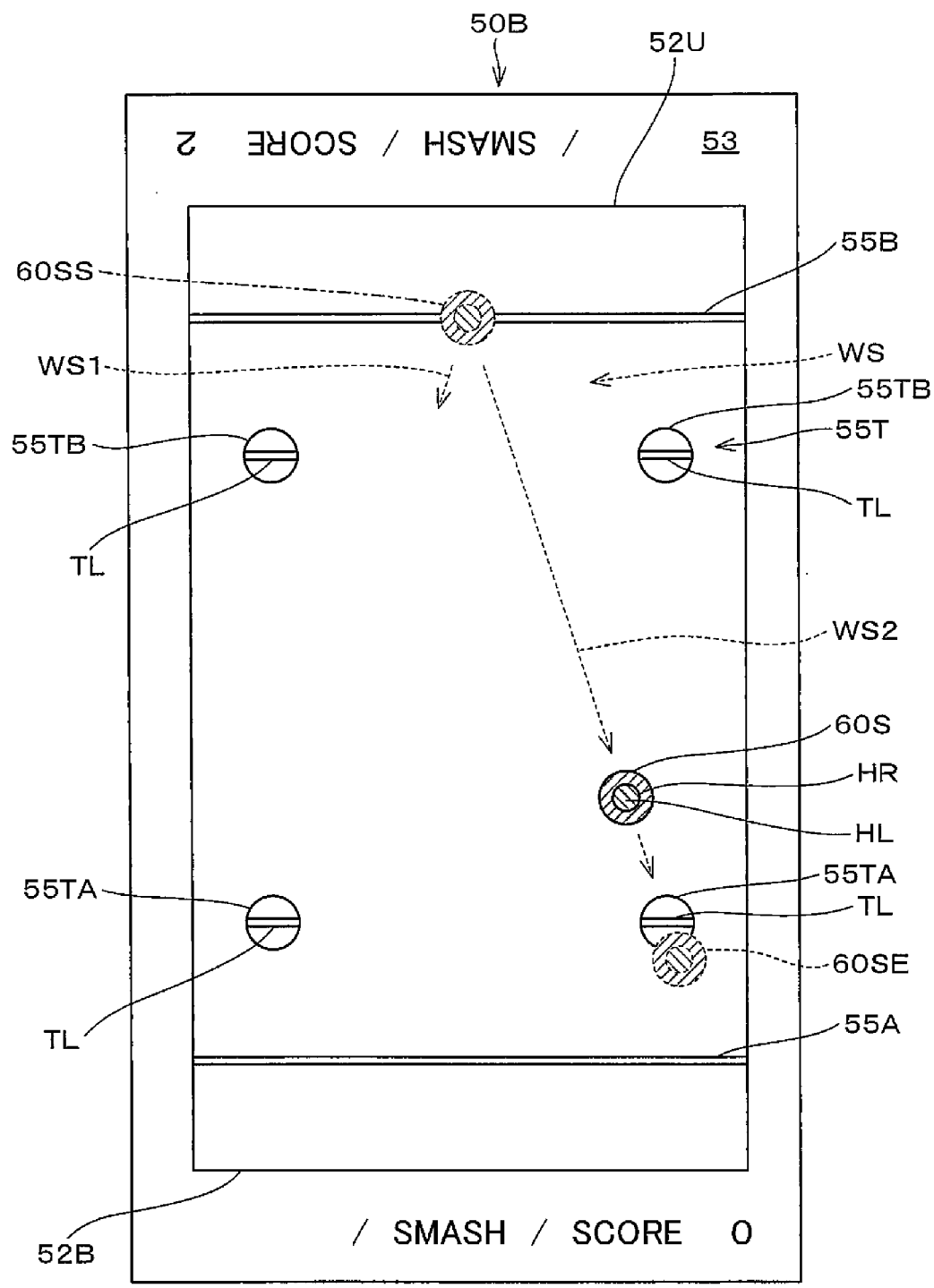
FIG. 5 is a diagram schematically illustrating a game screen in which a high difficulty level is set.

In a music game executed by the game machine 1, a difficulty level can be set before playing. FIG. 5 is a diagram schematically illustrating a game screen when a difficulty level higher than that of the game screen of FIG. 3 is set before playing as a difficulty level of the game. As illustrated in FIG. 5, a game screen 50B in which a high difficulty level is set is provided with two top reference portions 55T serving as specific reference portion, respectively, near the reference portions 55A and 55B as compared with the game screen 50A of FIG. 3. Each top reference portion 55T is arranged at the position at which a distance to the reference portion positioned at the opposite side is different from a distance between the reference portions 55A and 55B. In the example of FIG. 5, each top reference portion 55T is arranged at the position at which the distance is shorter than the distance between the reference portions 55A and 55B. In other words, two first top reference portions 55TA at the first reference portion 55A side are provided above the first reference portion 55A so as to be near the second reference portion 55B, and two second top reference portions 55TB at the second reference portion 55B side are provided below the second reference portion 55B so as to be near the first reference portion 55A.

In the example of FIG. 5, the top reference portions 55T are formed in a circle having the same shape and size as the object 60. Each of the top reference portions 55T is provided with a determination straight line TL that extends on the center thereof in parallel with each of the reference portions 55A and 55B. Each determination straight line TL is combined with the same color as the reference portion positioned near there. In other words, the determination straight line TL of each first top reference portion 55TA positioned near the first reference portion 55A is combined with red, and the determination straight line TL of the second top reference portion 55TB positioned near the second reference portion 55B is combined with blue.

Further, a specific object 60S that moves toward the top reference portion 55T appears on the game screen 50B to which the high difficulty level is set at an appropriate timing of music. The appeared specific object 60S moves toward any one of the top reference portions 55T. Further, the moving path W of the specific object 60S is decided by an immediately previous operation. However, the moving path W is limited to a specific moving path WS serving as a predetermined path such that movement of the specific object 60S is not inappropriate to an indication of an operation timing.

Furthermore, as an appropriate operation corresponding to the specific object 60S, each player is requested to perform a touch operation of touching the determination straight line TL in tune with an arrival of the specific object 60S at the determination straight line TL of each top reference portion 55T. When the touch operation is performed, a time difference between a time at which the specific object 60S matches the determination straight line TL and a time at which each player performs the touch operation on the determination straight line TL is detected, similarly to the case in which the object 60 matches the reference portion 55A or 55B. The smaller the time difference is, the higher the player's operation is evaluated. In this case, the determination straight line TL of each top reference portion 55T is used as a reference of a current time instead of the reference portion 55A or 55B. Further, the specific object 60S is displayed in a color different from the object 60 to be distinguished from the normal object 60.

In the example of FIG. 5, the specific object 60S represented by an alternate long and two short dashes line represents the appearance position of the specific object 60S. As illustrated in FIG. 5, in this example, the specific object 60S appears on the second reference portion 55B, a first specific path WS1 that heads toward the first top reference portion 55TA arranged at the left side and a second specific path WS2 that heads toward the first top reference portion 55TA arranged at the right side are provided as candidates of the moving path WS of the appeared specific object 60S. In other words, the number of the moving paths WS of the specific object 60S is limited to two.

Figure 6:
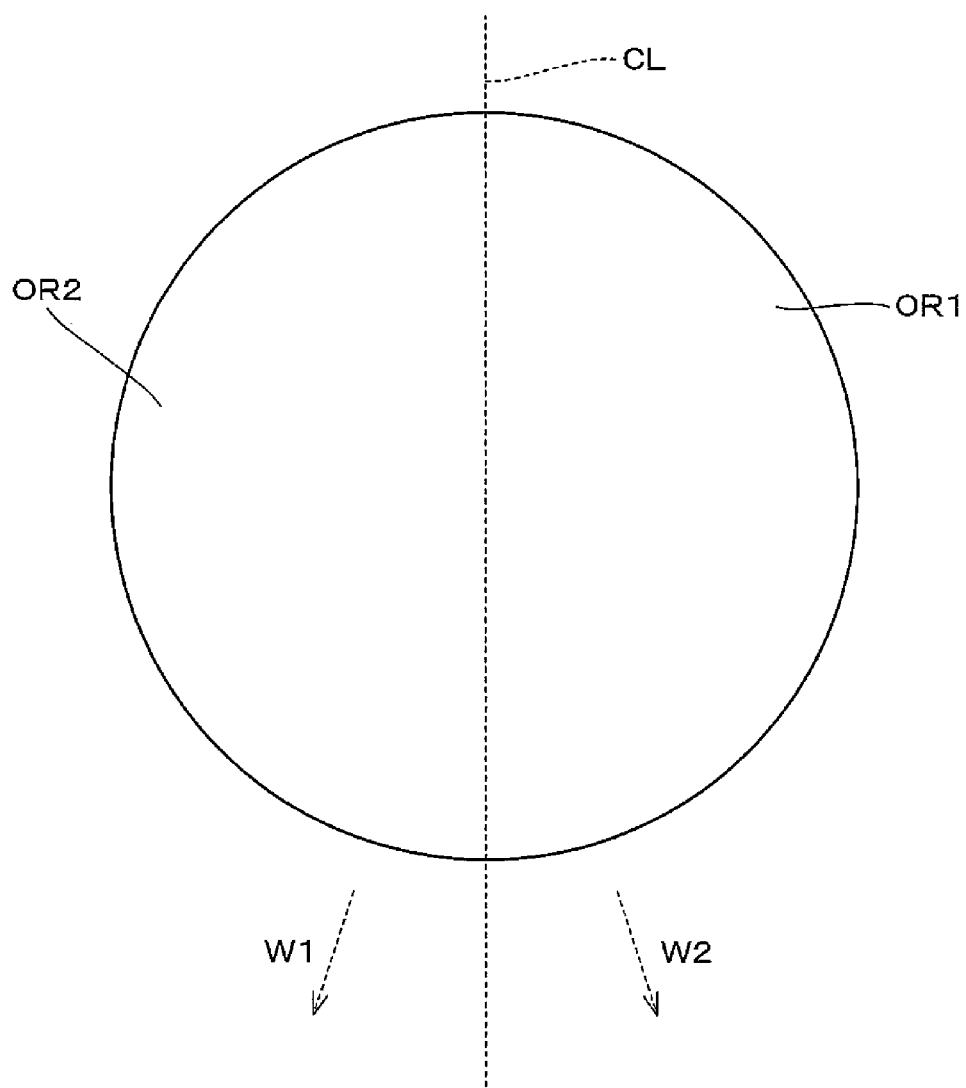
FIG. 6 is an enlarged view of an object for describing a region corresponding to a specific moving path.

Further, the moving path WS of the specific object 60S is decided depending on the touch operation on the object 60 that has arrived at the appearance position immediately before the specific object 60S appears. Specifically, the moving path WS of the specific object 60S is decided depending on a region of the object 60, arrived at the appearance position immediately before, on which the touch operation is performed. FIG. 6 is an enlarged view of the object 60 for describing a region corresponding to a specific moving path. A dashed line of FIG. 6 represents a central line CL that equally divides the object 60 into two regions. Further, the central line CL extends in a direction orthogonal to the reference portions 55A and 55B. The object 60 is equally divided into two regions, that is, a first region OR1 which is a right region and a second region OR2 which is a left region, by the central line CL. And, when the touch operation is performed on a region around the first region OR1 (including the region OR1), the first specific path WS1 is decided as the moving path, whereas when the touch operation is performed on a region around the second region OR2 (including the region OR2), the second specific path WS2 is decided as the moving path. Incidentally, when the touch operation is performed on the central line CL, either of the specific paths WS1 and WS2 is randomly decided as the moving path.

The example of FIG. 5 represents that the touch operation is performed on the second region OR2 of the object 60 which has arrived at the appearance position of the specific object 60S immediately before as the immediately previous operation. For this reason, in this example, the specific object 60S moves toward the first top reference portion 55TA arranged at the right side along the second specific path WS2 in response to the touch operation. In this case, each player preferably performs the touch operation on the determination straight line TL of the first top reference portion 55TA in tune with an arrival of the specific object 60S at the first top reference portion 55TA arranged at the right side. Further, in the example of FIG. 5, two colors, that is, a color corresponding to the determination straight line TL of a movement destination arranged on a central portion and green arranged therearound are used as a color of the specific object 60S. Specifically, in the example of FIG. 5, a range represented by a right hatched line HR is combined with green, and a central portion surrounded by the right hatched line HR, that is, a range represented by a left hatched line HL is combined with red which is combined with the determination straight line TL of the first top reference portion 55TA of the movement destination.

Further, in the example of FIG. 5, when an appropriate operation is not performed, that is, when a misoperation is made, the specific object 60S passes through the determination straight line TL, and then disappears at a predetermined position in front of the first reference portion 55A or the second reference portion 55B. The specific object 60S represented by the dashed line of FIG. 5 represents the disappearance position of the specific object 60S. In other words, as illustrated in FIG. 5, unlike the moving path W of the normal object 60 extending up to both end portions 52U and 52B, both of the specific paths WS1 and WS2 are set to extend to the position which does not reach to the reference portion 55A or 55B. For this reason, the specific object 60S disappears without arriving at the first reference portion 55A or the second reference portion 55B.

Furthermore, an object appearance area CR at which the object 60 appears is set to the game screen 50B to which the high difficulty level is set, separately from the reference portions 55A and 55B or both end portions 52U and 52B. The object appearance area CR is used in order to cause a next object to appear at the position which is inconsecutive to neither the arrival position of the object nor the position at which an appropriate operation is made. For example, the object appearance area CR is used as an appearance position of a next object 60 which was supposed to appear at the position at which the specific object 60S disappeared by a misoperation was to arrive.

Figure 7:
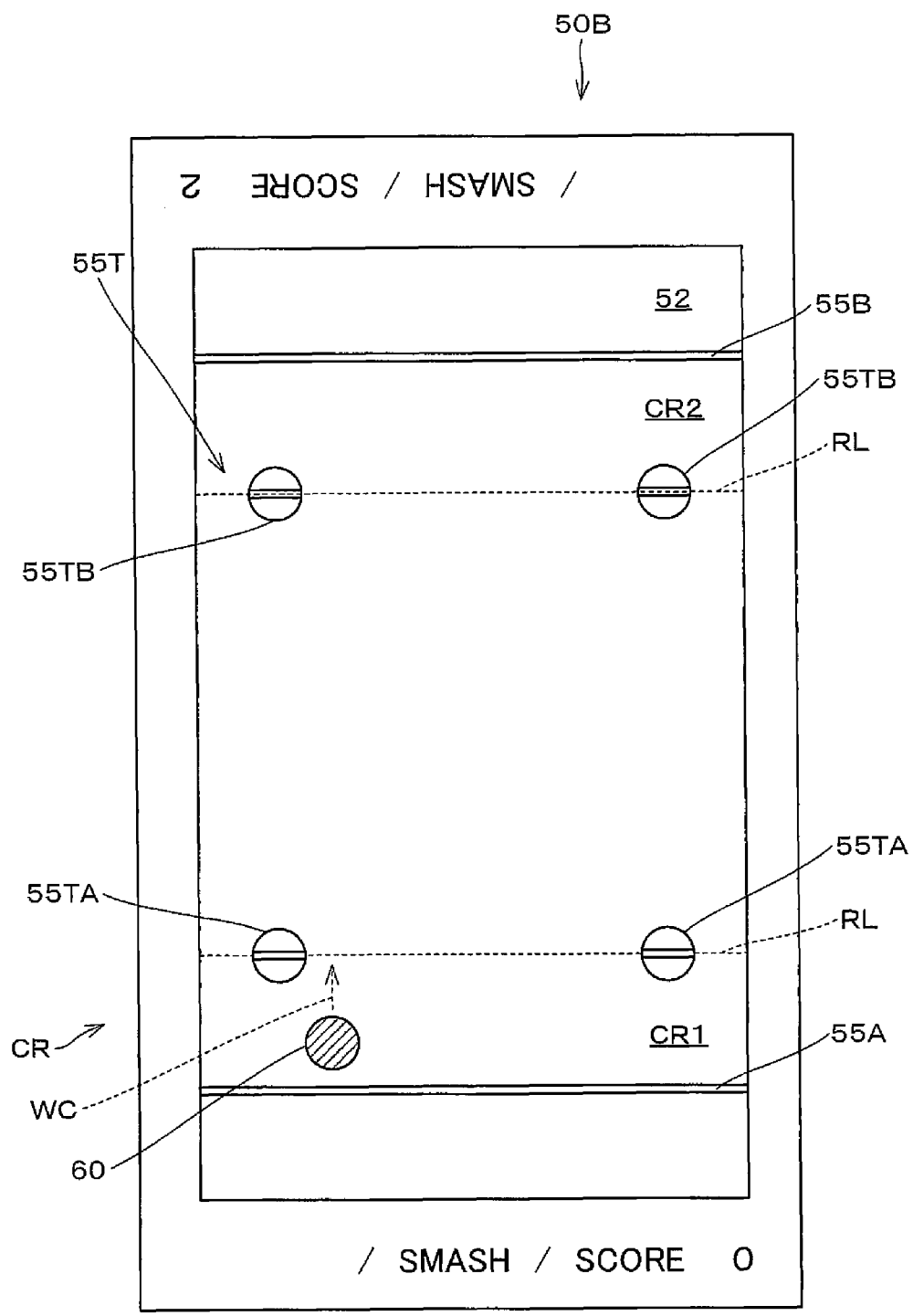
FIG. 7 is a diagram schematically illustrating a game screen for describing an object appearance area.

FIG. 7 is a schematic diagram illustrating a state in which the object 60 appears in the object appearance area CR. In the example of FIG. 7, an area between each top reference portion 55T and each of the reference portions 55A and 55B is set as the object appearance area CR. Specifically, an area between an extended line of the determination straight line TL of the first top reference portion 55TA and the first reference portion 55A is set as a first object appearance area CR1, and an area between an extended line of the determination straight line TL of the second top reference portion 55TB and the second reference portion 55B is set as a second object appearance area CR2. In the example of FIG. 7, the extended line of each determination straight line TL is represented by a dashed line RL. Incidentally, the dashed line RL representing each extended line is not displayed on the actual game screen.

Further, in the example of FIG. 7, the next object 60 corresponding to the specific object 60S that has disappeared in FIG. 5 appears in the first object appearance area CR1. The object 60 that has appeared in the first object appearance area CR1 moves toward the second reference portion 55B along a predetermined path WC. The predetermined path WC is set for each appearance position of the object appearance area CR in advance. As illustrated in FIG. 7, when the specific object 60S moves toward the first top reference portion 55TA and then disappears, the next object 60 appears in the first object appearance area CR1, and the appeared object 60 moves toward the second reference portion 55B. On the other hand, when the specific object 60S moves toward the second top reference portion 55TB and then disappears, the next object 60 appears in the second object appearance area CR2, and the appeared object 60 moves toward the first reference portion 55A. The appearance position in each object appearance area CR is randomly decided.

Figure 8:
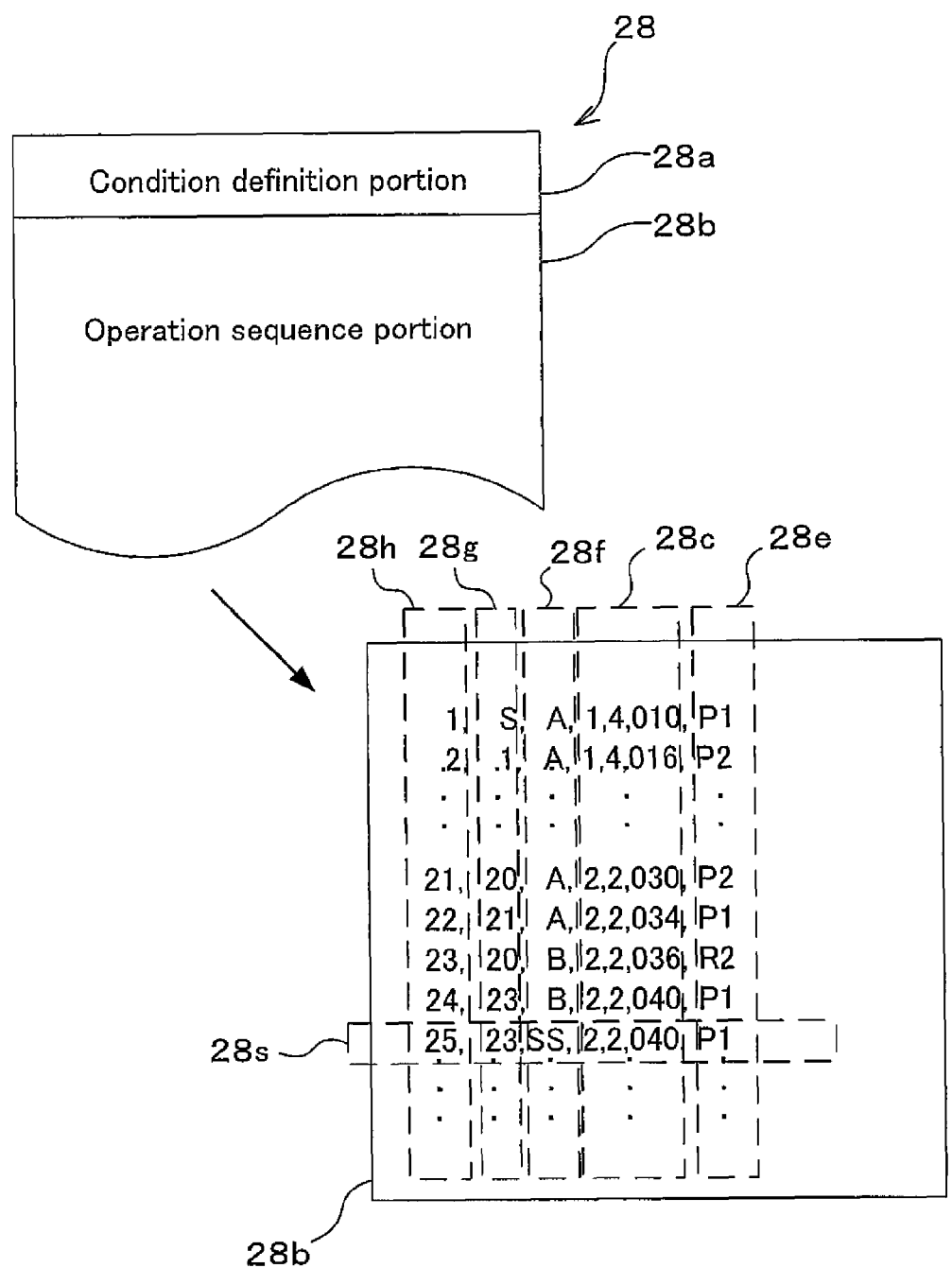
FIG. 8 is a diagram illustrating an example of content of sequence data.

Next, the details of the sequence data 28 will be described with reference to FIG. 8. The sequence data 28 includes a condition definition portion 28a and an operation sequence portion 28b as illustrated in FIG. 8. The condition definition portion 28a includes information described to designate an execution condition of a game that differs according to the music, such as information designating the tempo, a beat, and a track of the music, and a sound effect to be generated when the touch operation is performed on the object 60. Incidentally, in FIG. 8, the condition definition portion 28a is included only in the head portion of the sequence data 28, but the condition definition portion 28a may be added to an appropriate intermediate position of the operation sequence portion 28b. Thus, processing of changing the tempo in the music, an assignment of the sound effect, or the like can be actualized.

Meanwhile, in the operation sequence portion 28b, a timing to touch the object 60 and information indicating a player side on which the object starts to be displayed are described in association with each other for each object 60. Further, in the operation sequence portion 28b, information indicating a correspondence relation of each object 60 is described.

FIG. 8 is a diagram illustrating an example of content of the sequence data. As partially illustrated in FIG. 8, the operation sequence portion 28b includes an operation timing portion 28c that indicates a timing (operation timing) to make an operation in music, a player indicating portion 28e indicating a player in which the object 60 starts to be displayed, a mark information portion 28f indicating the object 60 to be displayed, a relation indicating portion 28g indicating a correspondence relation between the objects 60, and a record information portion 28h for discriminating between records. Thus, the operation sequence portion 28b is configured as a set of a plurality of records which are described in such a manner that an operation timing at which an operation is performed in the music is associated with a position at which the object 60 starts to be displayed for each object 60 to be displayed.

The operation timing is described such that a bar number in the music, the number of beats, and a value representing a time in a beat are separated by a comma. A time in a beat refers to an elapsed time from the head of one beat, and is represented by the number of units, from the head of the beat, obtained by equally dividing the length of one beat into n unit times. For example, when a time in which n is 100, and in a second beat of a first bar of the music ¼ elapses from the head of the second beat is designated as an operation timing, "01,2,025" is described.

Information indicating a player side at which the object 60 starts to be displayed is described in the player indicating portion 28e. Specifically, "P1" is described when the first reference portion 55A side corresponding to a first player is indicated, and "P2" is described when the second reference portion 55B side corresponding to a second player is indicated. Further, since the object 60 moves between the reference portions 55A and 55B, an indication of a player in which a display start is performed corresponds to an indication of a reference portion at which the touch operation is requested to be performed. Specifically, when the first reference portion 55A side is indicated as the position at which a display is started, the object 60 that has started to be displayed moves toward the second reference portion 55B at the opposite side and thus this corresponds to an indication of the touch operation on the second reference portion 55B. Similarly, when the second reference portion 55B side is indicated as the position at which a display is started, this is corresponds to an indication at the opposite side, that is, an indication of the touch operation on the first reference portion 55A positioned in the moving direction of the object 60 that has started to be displayed. Furthermore, an indication of a player in which the object 60 starts to be displayed also corresponds to an indication of a color of the object 60 to be displayed. A blue object is displayed in case of "P1," and a red object 60 is displayed in case of "P2."

Further, the player indicating portion 28e includes information indicating the object appearance area CR as the appearance position of the object 60. Specifically, "R1" is described in the player indicating portion 28e when the first object appearance area CR1 is indicated as the appearance position of the object 60, and "R2" is described in the player indicating portion 28e when the second object appearance area CR2 is indicated as the appearance position of the object 60. A timing at which the object 60 appears in each object appearance area CR is set to before one bar of operation timing. Further, a specific appearance position of each of the objects 60 and 60S in each object appearance area is randomly decided. Incidentally, a timing at which the object 60 appears in each object appearance area CR may be appropriately set. Further, a different timing may be set for each object. Furthermore, information indicating a timing at which the object 60 is to appear in each object appearance area CR may be included in the operation sequence portion 28b.

In the mark information portion 28f, a letter such as "A" is described as information indicating the object 60 to be displayed. "A" is used as a letter of alphabet corresponding to the first object 60 to be displayed on the game region 52, "B" is used as a letter of alphabet corresponding to the second object 60, and "C" is used as a letter of alphabet corresponding to the third object 60. In other words, various kinds of letters according to the number of objects 60 to be displayed on the game region 52 are used as information indicating the object 60 to be displayed.

Furthermore, the mark information portion 28*f* includes information indicating use of the specific object 60S. In the example of FIG. 8, "SS" is used to indicate the specific object 60S. A dashed line 28*s* of FIG. 8 represents a record instructing that the specific object 60S starts to be displayed.

A number corresponding to a sorting order is described in the record information portion 28*h* for each record. In other words, as record information, "1" is affixed to a first record, and then a unique number such as "2" and "3" is affixed to each record in order from the top.

Information designating a record number is described in the relation indicating portion 28*g*. In other words, a number such as "1," "2," and "3" is described as information indicating a correspondence relation. When "1" is described in the relation indicating portion 28*g*, a correspondence relation with a record in which "1" is affixed to the record information portion 28*h* is indicated. Specifically, an indication is made such that the position at which an object 60 corresponding to the number 1 of the record information portion 28*h* is appropriately touched or the position at which the object 60 arrives by a misoperation is used as the appearance position of the object 60 corresponding to a record in which "1" is described in the relation indicating portion 28*g*. Similarly, an indication is made such that the position at which an object 60 corresponding to a record in which "2" is affixed to the record information portion 28*h* is appropriately touched or the position at which the object 60 arrives is used as the appearance position when "2" is described in the relation indicating portion 28*g*. Further, an indication is made such that the position at which an object 60 corresponding to a record in which "3" is affixed to the record information portion 28*h* is appropriately touched or the position at which the object 60 arrives is used as the appearance position when "3" is described in the relation indicating portion 28*g*. Based on the description of the record information portion 28*h* and the relation indicating portion 28*g*, an object corresponding to a record in which one number is affixed to the record information portion 28*h* corresponds to one operation indication mark of the present invention, and an operation indication mark corresponding to a record in which the one number is described in the relation indicating portion 28*g* corresponds to a next operation indication mark of the present invention.

Furthermore, an indication of the relation indicating portion 28*g* corresponds to an indication of an appearance timing. Specifically, the object 60 corresponding to the record in which "1" is described in the relation indicating portion 28*g* starts to be displayed at a timing at which the object 60 corresponding to the record in which "1" is affixed to the record information portion 28*h* is appropriately touched (or a timing at which the object 60 arrives). In other words, in order to cause the object 60 to keep continuity, an indication causing a certain record to be associated with a record corresponding to a next object 60 is described in the relation indicating portion 28*g* so that the next object 60 can start to be displayed at the position at which the object 60 arrives (or a timing at which the object 60 is appropriately touched) at a timing at which the object 60 corresponding to the certain record arrives (or a timing at which the object 60 is appropriately touched).

Incidentally, in the example of FIG. 8, "S" indicating an initial display (in which a setting such as a display start which is performed at a fixed position at a fixed timing is made in advance) is described in a first record. Further, when the object appearance area CR is indicated in the player indicating portion 28*e*, description of information of the relation indicating portion 28*g* is not used. For this reason, description of information of the relation indicating portion 28*g* may not be made. Alternatively, certain information may be described in the relation indicating portion 28*g*, and this information may be used in decision of an appearance position in the object appearance area CR.

In the example of FIG. 8, an operation timing and a reference portion of a touch operation target are indicated such that a touch operation is performed on the second reference portion 55B at a timing in which "010" elapses from a start point in time of a fourth beat of a first bar, and a touch operation is performed on the first reference portion at a timing in which "016" elapses from the start point in time of the fourth beat of the first bar. Further, a correspondence relation between objects is indicated such that the red object 60 corresponding to the record with the number 2 appears at the position at which the object 60 corresponding to the record with the number 1 is appropriately touched or at the position at which the object 60 arrives, and the object 60 moves along the path W according to the player's operation so as to arrive at the first reference portion 55A at a timing at which "016" elapses from the start point in time of the fourth beat of the first bar.

Furthermore, in the example of FIG. 8, an object 60 corresponding to a record with a number 21 appears at the position at which an object 60 corresponding to a record (not illustrated) with a number 20 is appropriately operated or at the position at which the object 60 arrives, and the object 60 moves so as to arrive at the first reference portion 55A at a timing in which "030" elapses from a start point in time of a second beat of a second bar. Further, the object 60 appears in the second object appearance area CR2 at a timing which is one bar earlier than a timing in which "036" elapses from the start point in time of the second beat of the second bar, that is, a timing in which "036" elapses from the start point in time of the second beat of the first bar, and the object 60 moves so as to arrive at the first reference portion 55A at a timing in which "036" elapses from the start point in time of the second beat of the second bar. And, the object 60 and the specific object 60S appear at the position at which an object 60 corresponding to a record with a number 23 is appropriately operated or the position at which the object 60 arrives. The appeared object 60 moves so as to arrive at the second reference portion 55B at a timing in which "040" elapses from the start point in time of the second beat of the second bar. Meanwhile, the appeared specific object 60S moves so as to arrive at the second top reference portion 55TB at a timing in which "040" elapses from the start point in time of the second beat of the second bar. In both cases, an operation timing and a reference portion of a touch operation target are indicated such that the reference portion 55A, 55B, or 55T at the arrival position is touched in tune with an arrival of the object 60 or 60S at the reference portion 55A, 55B, or 55T.

Next, processing of the game control unit 11 when the music game is executed by the game machine 1 will be described. The game control unit 11 reads the game program 21, performs an initial setting necessary to execute a music game, and then enters a standby state to receive a game start instruction from a player. For example, the game start instruction includes an operation specifying data used in a game such as selection of music to be played in the game or a difficulty level. A procedure receiving the instruction may be the same as in a known game.

When a game start is instructed, the game control unit 11 causes the music to be reproduced from the speaker 8 by reading the music data 25 corresponding to the music selected by the player and outputting the read music data 25 to the audio output control unit 13. Through this operation, the control unit 10 functions as a music reproducing device. Further, the game control unit 11 causes the game region 52 and the information region 53 to be displayed on the monitor 3 by reading the sequence data 28 corresponding to the player's selection in synchronization with reproduction of the music, generating image data necessary to draw the game region 52 and the information region 53 with reference to the image data 27, and outputting the generated image data to the display control unit 12. Furthermore, as processes necessary to display the game region 52 or the like during execution of the music game, the game control unit 11 repeatedly executes a sequence process routine illustrated in FIG. 9, a path decision process routine illustrated in FIG. 10, and an operation evaluation routine illustrated in FIG. 11 at a predetermined period. Incidentally, the sequence processing unit 15 undertakes the routines of FIGS. 9 and 10, and the operation evaluating unit 16 undertakes the operation evaluation routine of FIG. 11.

Figure 9:
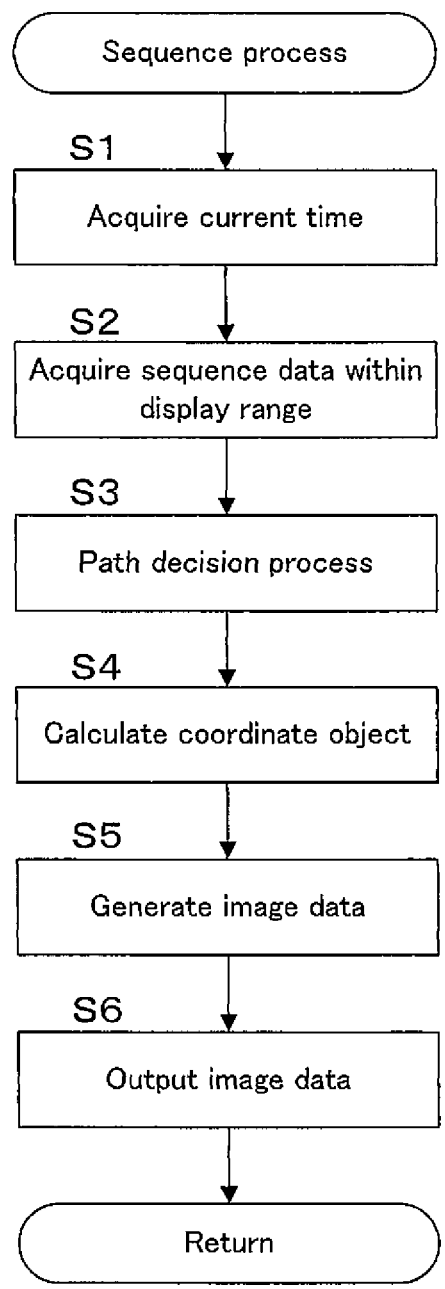
FIG. 9 is a diagram illustrating an example of a flowchart of a sequence process routine.

FIG. 9 illustrates an example of a flowchart of the sequence process routine executed by the sequence processing unit 15. When the routine of FIG. 9 starts, in step S1, the sequence processing unit 15 of the game control unit 11 first acquires a current time in the music. For example, clocking starts, by an internal clock of the game control unit 11, from a reproduction start point in time of the music, and the current time is acquired based on a value of the internal clock. Next, in step S2, the sequence processing unit 15 acquires data of an operation timing which is present within a time length corresponding to a display range of the game region 52 from the sequence data 28. For example, the display range is set to a time range of about two bars of music from the current time to the future.

Figure 10:
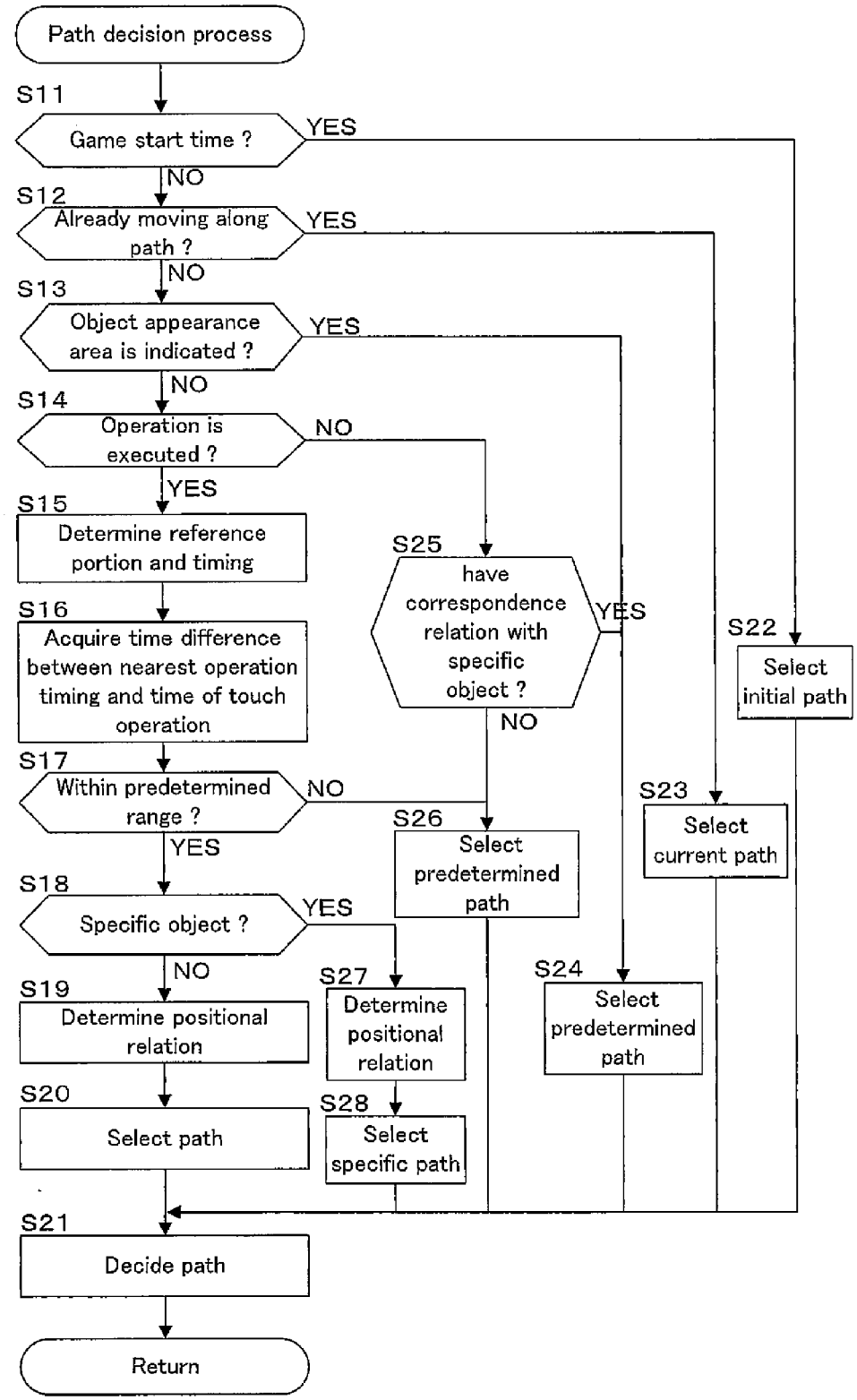
FIG. 10 is a diagram illustrating an example of a flowchart of a path decision process routine.

Next, in step S3, paths W of all objects to be displayed in association with the acquired operating timings are decided. For example, this decision is actualized by executing the routine of FIG. 10 on each object. FIG. 10 illustrates an example of a flowchart of the path decision process routine executed by the sequence processing unit 15. When the routine of FIG. 10 starts, in step S11, the sequence processing unit 15 first determines whether or not this is a start time of the game. When a positive determination is made in this step S11, the process proceeds to step S22, but when a negative determination is made, the process proceeds to step S12. In step S22, a previously set initial path is selected as a path to display the object, and then the process proceeds to step S21. For example, the path W3 extending from the rebounding point R1 which is included in the first reference portion 55A and which is at an n-th position from the left side is set in advance as the initial path.

Meanwhile, in step S12, it is determined whether or not the object 60 or 60S to be displayed is already moving along the path W. When a positive determination is made in step S12, that is, when it is determined that the object of the determination target is already moving along the decided path W, the process proceeds to step S23. In step S23, a previously selected path, that is, a current path is selected as a path to be displayed, and the process proceeds to step S21.

In contrast, when a negative determination is made in step S12, that is, when it is determined that the object of the determination target is not moving along the path W, the process proceeds to step S13. In step S13, it is determined whether or not the object appearance area CR is indicated on the object of the determination target as the appearance position with reference to the player indicating portion 28e of the sequence data 28. When a positive determination is made, that is, when it is determined that the object appearance area CR is indicated, the process proceeds to step S24. In step S24, the appearance position is randomly decided in either of the indicated first object appearance area CR1 or the second object appearance area CR2, the path WC set to the decided appearance position is selected as a predetermined path, and the process proceeds to step S21.

When a negative determination is made in step S13, that is, when it is determined that the object appearance area CR is not indicated, the process proceeds to step S14. In step S14, it is determined whether or not the reference portion 55A, 55B, or 55T has been touched with reference to the output signal of the touch panel 5. When a negative determination is made in step S14, the process proceeds to step S25, but when a positive determination is made, the process proceeds to step S15.

In step S25, it is determined whether or not an object of a determination target has a correspondence relation with the specific object 60S, that is, it is determined whether or not an object serving to indicate an appearance position of an object of a determination target is the specific object 60S. When a positive determination is made, that is, when it is determined that an object serving to indicate an appearance position of an object of a determination target is the specific object 60S, the process proceeds to step S24. In step S24, first, among the object appearance areas CR, an indicated area is determined based on the sequence data 28 of the determination target. Then, as described above, an appearance position is randomly decided in each indicated area CR, the path WC set to the decided appearance position is selected as a predetermined path, and then the process proceeds to step S21.

When a negative determination is made in step S25, that is, when it is determined that an object serving to indicate an appearance position of an object of a determination target is not the specific object 60S, the process proceeds to step S26. In step S26, a predetermined path is selected as a path to display an object, and then the process proceeds to step S21. For example, a path adjacent to a moving path of an object in which a relation is indicated in the sequence data 28 and which has already moved along a decided path, or a path having a shortest distance extending from an arrival position of the object is set as the predetermined path of step S26. Further, when the object of the determination target is the specific object 60S, a setting may be made to use a path randomly selected from the specific path WS as the predetermined path.

Meanwhile, in step S15, a reference portion on which the touch operation has been performed and a timing (a time in the music) at which the touch operation has been performed are determined based on a signal output from the touch panel 5. Next, in step S16, a nearest operation timing described in the sequence data 28 with respect to the reference portion on which the touch operation has been performed, that is, an operation timing which is closest in time and associated in the sequence data 28 with respect to the object on which the touch operation has been performed is specified, and a time difference between the operation timing and a time at which the touch operation has been performed is acquired.

Next, in step S17, the sequence processing unit 15 determines whether or not each player's operation is appropriate by determining whether or not the time difference is within a predetermined range. A predetermined time range around an operation timing of a comparison target is set as the predetermined range. When a negative determination is made in step S17, the process proceeds to step S26, and a predetermined path is selected as a path to display the object as described above, and then the process proceeds to step S21. In contrast, when a positive determination is made in step S17, the process proceeds to step S18.

In step S18, it is determined whether or not the object of the determination target is the specific object 60S with reference to the mark information portion 28f of the sequence data 28. When a positive determination is made, that is, when it is determined that the object of the determination target is the specific object 60S, the process proceeds to step S27. In step S27, the positional relation between the touched operation position of the top reference portion 55T and the position of the object 60 is determined based on the signal output from the touch panel 5. Specifically, a region of the object having the correspondence relation with the object of the determination target, that is, a region of the object serving to indicate the appearance position of the object of the determination target is determined as the touch position. In this case, either of the regions OR1 and OR2 equally divided by the central line CL of FIG. 6 described above is determined as the touch position. Next, in step S28, the specific path WS to arrange the specific object 60S is selected according to the positional relation determined in step S27. For example, this selection is made such that the first specific path WS1 previously assigned to the region OR1 is selected when the touch position is a region (including the region OR1) around the first region OR1, and the second specific path WS2 previously assigned to the region OR2 is selected when the touch position is a region (including the region OR1) around the second region OR2. Incidentally, when the touch position is on the central line CL, any one of the specific paths WS1 and WS2 is randomly selected.

Meanwhile, when a negative determination is made in step S18, that is, when it is determined that the object of the determination target is not the specific object 60S, the process proceeds to step S19. In step S19, the positional relation between the touched operation position of the reference portion 55A or 55B and the position of the object is determined based on the signal output from the touch panel 5. The regions S, O, R, and L described with reference to FIG. 4 are used for the determination of the positional relation. Specifically, a region (including each region) around the contact region S, the right region R, the left region L, or the remaining region of the object having the correspondence relation with the object of the determination target, that is, the object 60 that has most recently arrived at the appearance position of the object of the determination target is determined as the touch position.

Next, in step S20, a path to arrange the object 60 is selected according to the positional relation determined in step S19. For example, the selection of the path is performed as follows. First, the right region R, the left region L, the contact region S, or the remaining region O is assigned to each path W set to the appearance position in advance. Next, a path assigned to the touch position is selected from among the paths W extending from the appearance position based on the determination result of step S19. In the example of FIG. 3, in the rebounding point R1, a straight line path W2 is assigned to the contact region S and the remaining region O, a first right path W3 is assigned to the left region L, and a first left path W1 is assigned to the right region R. And, the straight line path W2 is selected when the contact region S or the remaining region O of the object is touched, the first left path W1 is selected when the right region R is touched, and the first right path W3 is selected when the left region L is touched.

Next, in step S21, the path selected in step S20, step S22, step S23, step S24, step S26, or step S28 is decided as a path to display the object, and the current routine ends.

Referring back to the routine of FIG. 9, in step S4, the sequence processing unit 15 calculates coordinates of all objects 60 and 60S to be displayed on each path W in the game region 52. For example, this calculation is performed as follows. First, the path W to display each object 60 or 60S included in the display range is determined based on the processing result of step S3. Next, the position of each object 60 or 60S from the reference portion 55A, 55B, or 55T in the time axis direction (that is, the moving direction of the object) is determined according to the moving direction (the reference portion 55A, 55B, or the 55T as the arrival position) corresponding to each the object 60 or 60S and a time difference between each operation timing and a current time. Through this operation, it is possible to acquire the path W to arrange each object 60 or 60S and coordinates of each object 60 or 60S necessary to arrange each object 60 or 60S on the corresponding path W along the time axis from the reference portion 55A, 55B, or the 55T.

Next, in step S5, the sequence processing unit 15 generates image data necessary to draw the game region 52 based on the coordinates of the object 60 or 60S calculated in step S4. Specifically, image data that causes each object 60 or 60S to be arranged on the calculated coordinates is generated. An image of the object 60 or the like may be acquired from the image data 27. Next, in step S6, the sequence processing unit 15 outputs the image data to the display control unit 12. As a result, the game region 52 is displayed on the monitor 3. When the process of step S6 ends, the sequence processing unit 15 ends the current sequence process routine. By executing repeatedly the above-described process, the object 60 or 60S moves among the reference portions 55A, 55B, and 55T so as to arrive at the designated reference portion 55A, 55B or 55T at an operation timing described in the sequence data 28 while maintaining continuity of movement. Further, when a misoperation is performed on the specific object 60S, after the object 60S disappears, a next object having a correspondence relation with the object 60S appears in the object appearance area CR, and moves toward the reference portion at the arrival position.

Figure 11:
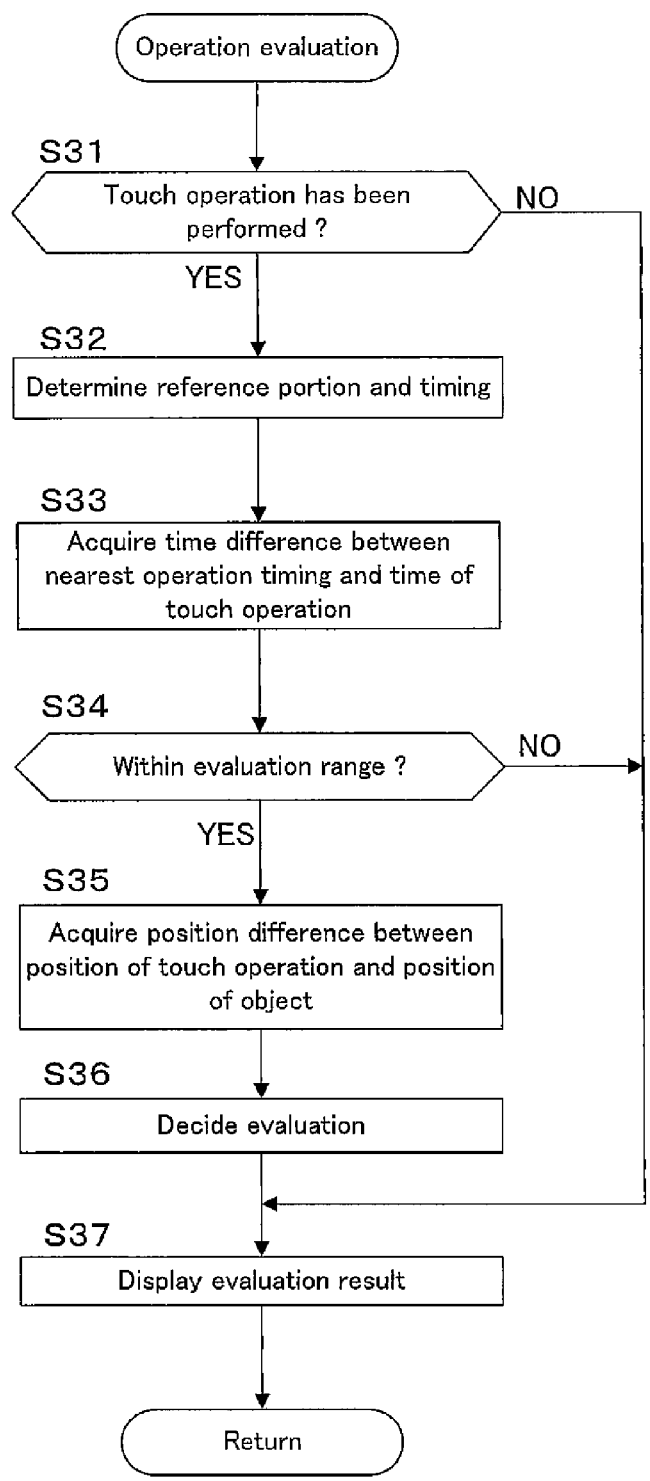
FIG. 11 is a diagram illustrating an example of a flowchart of an operation evaluating routine.

Next, the operation evaluation routine of FIG. 11 will be described. When the operation evaluation routine of FIG. 11 starts, in step S31, the operation evaluating unit 16 first determines the presence or absence of the touch operation on the reference portion 55A, 55B, or 55T with reference to an output signal of the touch panel 5. At this time, when the position other than the reference portion 55A, 55B, or 55T is touched, it is determined that no touch operation has been performed. When it is determined that no touch operation has been performed, the operation evaluating unit 16 ends the current routine, and when it is determined that the touch operation has been performed, the process proceeds to step S32. In step S32, the operation evaluating unit 16 determines a timing (a time in the music) at which the touch operation has been performed based on a position signal output from the touch panel 5. Next, in step S33, the operation evaluating unit 16 specifies a nearest operation timing described in the sequence data 28 with respect to the reference portion on which the touch operation has been performed, that is, an operation timing which is closest in time in the sequence data 28 with respect to the reference portion on which the touch operation has been performed, and acquires a time difference between the operation timing and a time at which the touch operation has been performed.

Next, in step S34, the operation evaluating unit 16 determines whether or not the player's operation is appropriate by determining whether or not the time difference is within the evaluation range. A predetermined time range around an operation timing of a comparison target is set as the evaluation range. For example, a plurality of steps of levels is set centering on an operation timing, and a time range in which the levels are set is dealt as the evaluation range. When it is determined in step S34 that the time difference is outside the evaluation range, the operation evaluating unit 16 ends the current routine, but when it is determined that the time difference is within the evaluation range, the process proceeds to step S35. In step S36, the operation evaluating unit 16 specifies an operation position at which the touch operation has been performed on the reference portion 55A, 55B, or 55T and an operation timing which is closest in time in the sequence data 28 with respect to the reference portion at which the touch operation has been performed, and acquires a position difference between the operation position and the arrival position of the object indicating the operation timing.

Next, in step S36, the operation evaluating unit 16 decides an evaluation on the player's touch operation based on the time difference acquired in step S34 and the position difference acquired in step S35. For example, this evaluation is actualized as follows. First, the evaluation related to the time difference is actualized by determining which one of a plurality of levels set in the time range a timing of the touch operation belongs to. A plurality of levels are set such that the time range is divided in units of predetermined time periods, and the touch operation that belongs to a division close to an operation timing of each division is evaluated high. Further, the evaluation related to the position difference is actualized by comparing the center position of the object 60 or 60S and the touch operation position. For example, in the evaluation of the position difference, a region up to twice the diameter of the object 60 or 60S is evaluated as "GOOD", and the remaining region is evaluated as "MISS." Alternatively, the inner side further than the outer circumference of the object 60 or 60S may be evaluated highest, a predetermined evaluation range may be set such that an evaluation is steadily lowered in units of predetermined distances from the outer circumference, and the evaluation may be determined according to which position in the evaluation range the position of the touch operation belongs to. In this case, a difficulty level of a game is improved.

Incidentally, since both the evaluation range used for the time difference and the evaluation range used for the position difference are set based on the time range, an evaluation target region of a game screen differs according to the moving velocity of the object 60 or 60S of an evaluation target. Specifically, when the moving velocity of the object 60 or 60S is fast, the evaluation target region of the game screen 50A or 50B is set to a broad range. In contrast, when the moving velocity of the object 60 or 60S is slow, the evaluation target region of the game screen 50A or 50B is set to a narrow range. Further, since the moving velocity of the object 60 is different from the moving velocity of the object 60S, the evaluation target region of the game screen 50A or 50B of the object 60 or 60S is set for each object.

After step S36 is executed, the operation evaluating unit 16 proceeds to step S37, and controls an output to the display control unit 12 such that the evaluation result is displayed on at least one of the game region 52 and the information region 53. When the process of step S37 is completed, the operation evaluating unit 16 ends the current routine. Incidentally, a step acquiring the difference between the position of the object and the position of the touch operation in the example of FIG. 11 may be executed before a step of acquiring the difference between the nearest operation timing of the reference portion and a time at which the touch operation has been performed. Further, in the example of FIG. 11, the evaluation of the position difference is configured so as to be evaluated as "GOOD" or "MISS" according to a region, but when the position difference is outside a predetermined range, similarly to the process of step S34, the subsequent process may be skipped, and then the current routine may end. In this case, for example, when an operation on the first reference portion 55A is required, an operation on an inappropriate position outside a predetermined range such as an operation executed on the second reference portion 55B can be excluded from an evaluation target.

As described above, according to this embodiment, in addition to the reference portions 55A and 55B at which the object 60 is to arrive, the top reference portion 55T is provided, near reference portions 55A and 55B, on the game screen 50B having a high difficulty level. Furthermore, the specific object 60S moving toward each top reference portion 55T is generated at an appropriate timing. For this reason, the player needs to consider the top reference portions 55T as well as the two reference portions 55A and 55B arranged at both ends portions 52U and 52B of the game region 52. Thus, it is possible to change the number of positions to which the player needs to give consideration, and it is possible to prevent the player's point of view from being fixed to a certain position. Accordingly, it is possible to change a difficulty level of a game without uniformly increasing the number of objects 60 displayed on the game screen nor uniformly increasing the moving velocity of all objects displayed on the game screen other than each object.

Further, the moving path of the specific object 60S to each top reference portion 55T is limited to the two specific paths WS1 and WS2. If a path rebounding from the left or right walls 52L or 52R is selected as the moving path of the specific object 60S, an arrival timing is constant, but a moving distance increases, and thus there is a case that the moving velocity is too fast inappropriately for an operation instruction. Further, when an object rebounds from either of the left and right walls 52L and 52R immediately before the top reference portion 55T, an angle at which an object approaches the top reference portion 55T may be excessively steep. The steep approach angle is difficult to be visually recognized, and is not appropriate to an operation indication. According to this embodiment, a path rebounding from the left or right wall 52L or 52R which is likely to cause an inappropriate approach angle or an inappropriate moving velocity is excluded, and the moving path WS of the specific object 60S is limited to the two specific paths WS1 and WS2 heading toward each top reference portion 55T. Thus, it is possible to prevent movement of the specific object 60S from having a moving velocity or a display which is inappropriate to an indication of an operation timing.

And, the specific object 60S disappears without arriving at the first reference portion 55A or the second reference portion 55B after passing through each top reference portion 55T. If the specific object 60S moves until it arrives at the end portion 52U or 52B similarly to the case in which a misoperation is performed on the object 60, the moving velocity of an object to appear next is faster than the velocity at which the specific object 60S has moved. Specifically, first, each top reference portion 55T is arranged at the position close to the reference portion at the opposite side, and thus each top reference portion 55T is arranged at the position which is farther from the end portion 52U or 52B than from each reference portion 55A or 55B. Meanwhile, an operation timing indicated by the next object having the correspondence relation with the specific object 60S, that is, the object to appear at the arrival position of the specific object 60S is constant. For this reason, the moving distance of the next object on which a misoperation is made is longer when a misoperation is made on the specific object 60S than when a misoperation is made on the object 60. In other words, the velocity difference between when a misoperation is made and when an appropriate operation is made is more remarkable when a misoperation is made on the specific object 60S than when a misoperation is made on the object 60. The slower the moving velocity of the specific object 60S is, the more the velocity difference. In the example of FIG. 5, the number of the moving paths WS of the specific object 60S is limited to two, but if the specific object 60S moves along a long-distance path in which the specific object 60S rebounds the left or right wall 52L or 52R twice or more and when the moving velocity of the specific object 60S is slow, the velocity difference further increases.

Further, although the misoperated specific object 60S does not move up to the end portion 52U or 52B, if the specific object 60S keeps moving along the moving path WS, the specific object 60S arrives at the first reference portion 55A or the second reference portion 55B. The touch operation on the specific object 60S is already requested when the specific object 60S arrives at each top reference portion 55T. For this reason, it is unnecessary to request the player to perform the touch operation in tune with an arrival of the specific object 60S at each reference portion 55A or 55B. When the specific object 60S arrives at each reference portion 55A or 55B, the player's touch operation is likely to be induced, and thus it is necessary to prevent the induction of the operation. According to this embodiment, the specific object 60S disappears after passing through each top reference portion 55T, and thus the specific object 60S is prevented from arriving at the first reference portion 55A or the second reference portion 55B. Thus, it is possible to prevent the induction of the unnecessary operation or the occurrence of the large velocity difference described above.

Furthermore, the object appearance area CR in which the object 60 or 60S can appear is separately set. In the case of the normal object 60, the object 60 moves up to the end portion 52U or 52B when a misoperation is made, the position at which the object 60 arrives serves as the appearance position of the next object, and the path W extending from the appearance position is used as the moving path of the next object. However, as described above, when the specific object 60S disappears due to the misoperation, the specific object 60S does not arrive at the end portion 52U or 52B. For this reason, there is no appropriate position at which the next object associated with the specific object 60S is to appear. According to this embodiment, since the object appearance area CR is separately set, even in the case of the object having no appropriate appearance position, it is possible to cause the next object to appear using the area CR by a relatively natural rendering effect. Furthermore, when the object appears according to the appropriate operation, the object appearance area CR can be also used as the appearance position of the object whose moving velocity is excessively reduced due to the relation with the arrival timing. Thus, it is possible to prevent a game from being monotonous.

As described above, when the object appearance area CR is used, the position unrelated to the arrival position of the object serving to indicate the appearance position of the object cased to appear can be used as the appearance position. For this reason, it is possible to increase a degree of freedom of an appearance position or an appearance timing of an object. Thus, since it is possible to cause the object to appear without any limitation to the appearance position or the appearance timing, a continuous operation indication to one player or a rendering effect such as an event can be actualized. In other words, using the object appearance area CR, amusement of the game can be improved.

In the above embodiment, the external storage device 20 of the game machine 1 functions as a music data storage device and a sequence data storage device. Further, the control unit 10 functions as a game region presenting device, a mark display control device, and a position change device by causing the sequence processing unit 15 to execute the routines of FIGS. 9 and 10. Furthermore, the control unit 10 functions as an evaluating device by causing the operation evaluating unit 16 to execute the routine of FIG. 11.

The present invention is not limited to the above embodiment and can be actualized in appropriate embodiments. In the above embodiment, the specific reference portion is arranged at the position close to the reference portion 55A or 55B arranged at the opposite side, but the present invention is not limited to this embodiment. For example, the specific reference portion may be arranged at the position which is farther from the reference portion arranged at the opposite side than from the reference portion arranged at the same end portion side, that is, at the position at which the distance from the reference portion at the opposite side is larger than the distance between the reference portions 55A and 55B.

In the above embodiment, the two top reference portions 55T are provided near the first reference portion 55A and the second reference portion 55B as the specific reference portion, but the number of specific reference portions is not limited to two. For example, one specific reference portion may be provided near each of the reference portions 55A and 55B, and three or more specific reference portions may be provided. Further, in the above embodiment, the specific reference portion corresponding to each player is provided near the reference portion at each player side, but the present invention is not limited to this embodiment. For example, the specific reference portion corresponding to each player may be provided near the reference portion at the opposite side to the reference portion used by each player. Further, the present invention is not limited to the embodiment in which the specific reference portion is arranged near another reference portion such as the first reference portion 55A or the second reference portion 55B, that is, at the position at which a distance from a certain reference portion is smaller than the distance from a reference portion other than the certain reference portion. For example, the specific reference portion may be arranged at the middle portion between the first reference portion 55A and the second reference portion 55B, that is, at the position at which the distance from the first reference portion 55A is equal to the distance from the second reference portion 55B. In this case, the specific reference portion may be shared by the player at the first reference portion 55A side and the player at the second reference portion 55B side or may be provided for each player.

Furthermore, an embodiment of the specific reference portion is not limited to the shape or the size described above, may have, for example, a quadrangular shape or an elliptical shape and the size larger than an object, or may be only a straight line corresponding to the determination straight line TL. Further, for example, the specific reference portion may be set by a rendering effect by which the position of the first reference portion 55A or the second reference portion 55B moves. Furthermore, a rendering effect by which the first reference portion 55A and the second reference portion 55B fade out of the game screen, and only the specific reference portion is displayed as the reference portion may be made. Through the fading-out effect, the induction of an unnecessary operation can be prevented even without causing the specific object 60S to disappear. Particularly, when the specific reference portion is arranged at the position which is farther from the reference portion arranged at the opposite side than from the reference portion arranged at the same end portion side, the specific object 60S arrives at another reference portion before arriving at the specific reference portion. In this case, even an operation indication on the specific reference portion may is likely to induce an erroneous operation on another reference portion. However, according to the embodiment in which the first reference portion 55A and the second reference portion 55B fade out, it is possible to cause the first reference portion 55A and the second reference portion 55B to fade out of the game screen when the specific object 60S passes, and thus the induction of the erroneous operation can be prevented.

Further, in the above embodiment, the specific reference portion is displayed on the game region by a difficulty level setting before playing, but the present invention is not limited to this embodiment, and the specific reference portion may be set to the game region when a predetermined condition is satisfied. For example, as the predetermined condition, a specific operation during a game such as a case in which a touch operation is performed in a predetermined direction or at a predetermined velocity may be employed, and an event during a game or another option may be employed.

In the above embodiment, an area between the first reference portion 55A and the first top reference portion 55TA and an area between the second reference portion 55B and the second top reference portion 55TB are set as the object appearance areas CR, but the present invention is not limited to the positions. For example, an area near the center of the game region may be set as the object appearance area CR and may be shared by the reference portions 55A and 55B. Further, in the above embodiment, a setting is made such that the object moving toward the second reference portion 55B side appears in the first object appearance area CR1, and the object moving toward the first reference portion 55A side appears in the second object appearance area CR2, but the present invention is not limited to this embodiment. For example, on the contrary, a setting may be made such that the object moving toward the first reference portion 55A side appears in the first object appearance area CR1, and the object moving toward the second reference portion 55B side appears in the second object appearance area CR2. As a result, a difficulty level of the game can be changed.

In the above embodiment, when a misoperation is performed on the specific object 60S, the specific object 60S disappears after an operation timing elapses, and the next object having the correspondence relation with the specific object 60S appears in the object appearance area CR, but the present invention is not limited to this embodiment. For example, the present invention is not limited to the specific object 60S, and when the moving velocity of the object is slower than a predetermined range, the corresponding object may disappear after an operation timing elapses, and a next object having the correspondence relation with the corresponding object may appear in the object appearance area CR. In this case, it is possible to prevent a game from being monotonous, and it is possible to suppress the velocity difference with the moving velocity of the next object that may occur by an addition of the distance to the end portion 52U or 52B to the moving distance. Alternatively, the velocity difference between an object that has arrived at the end portion 52U or 52B and a next object may be calculated, and when the velocity difference exceeds a predetermined range, the disappearance and the appearance in the object appearance area CR may be actualized. Further, the present invention is not limited to the embodiment in which the disappearance timing of the specific object 60S is synchronized with the appearance timing of the next object having the correspondence relation with the specific object 60S, and the disappearance timing and the appearance timing come in one after the other. In other words, the disappearance timing may come before the appearance timing, and the appearance timing may come before the disappearance timing.

In the above embodiment, a difference in color is used to distinguish the specific object 60S from the normal object 60, but the present invention is not limited to this embodiment. For example, the specific object 60S may have a shape, a pattern, or the like different from the object 60.

Similarly, in the above embodiment, the moving path along which the object moves toward the next reference portion is decided according to the positional relation between the position of the touch operation and the position of the object, but the decision of the moving path is not limited to the embodiment according to the positional relation. For example, the moving path may be decided according to an operation designating a direction such that the position of the touch operation continuously changes, and the moving velocity may be decided according to the change speed of the continuous change.

Further, the above embodiment has been described in connection with the example in which the three paths W extend from one rebounding point R1 or R2, but the number of paths extending from each rebounding point is not limited. Thus, many paths omnidirectionally extending from each rebounding point may be set. Further, many rebounding points may be provided as the rebounding point R1 or R2 included in each reference portion 55A or 55B. In other words, a plurality of paths may be provided such that an operation indication mark omnidirectionally moves among all positions of each reference portion. Furthermore, many rebounding points may be provided as the rebounding point on both sidewalls 52R and 52L of the game region 52, and many paths may be provided as a path from the rebounding point. Thus, many paths up to the rebounding points and many paths after rebounding can be set.

Further, a region (which is assigned to each path) set to each of the objects 60 and 60S is not limited to the above embodiment. The operation indication mark may be divided into many regions corresponding to many paths provided in the game region. Thus, it is possible to move the operation indication mark along a free path between the reference portions in response to the touch operation. Further, the present invention is not limited to the embodiment in which the operation indication mark is divided into a plurality of regions, and for example, the moving path of the operation indication mark may be decided by comparing the fixed position such as the central position of the operation indication mark with the touch operation position.

Similarly, in the above embodiment, the moving path of the specific object 60S is limited to the two specific paths respectively heading to the left and right top reference portions 55T, but the present invention is not limited to this embodiment. As far as the velocity, the approach angle, and the like inappropriate to an indication of an operation timing are not caused, various paths and a plurality of paths heading to the left or right top reference portion including a path rebounding from the left or right wall may be employed as a path along which the specific object 60S moves. A path rebounding from each wall 52L or 52R at the front side in a moving direction of an object further than the central position between the first reference portion 55A and the second reference portion 55B may be used as an example of the moving path of the specific object 60S that does not cause the approach angle to be inappropriate while allowing rebounding from the left or right wall. Further, in the embodiment in which the moving path of the object 60 or 60S is freely selectable, in order to prevent a path inappropriate to an indication of an operation timing from being used as the moving path of the object 60 or 60S, the sequence processing unit 15 may be configured so as to execute a path correction process routine as an example illustrated in FIG. 12.

Figure 12:
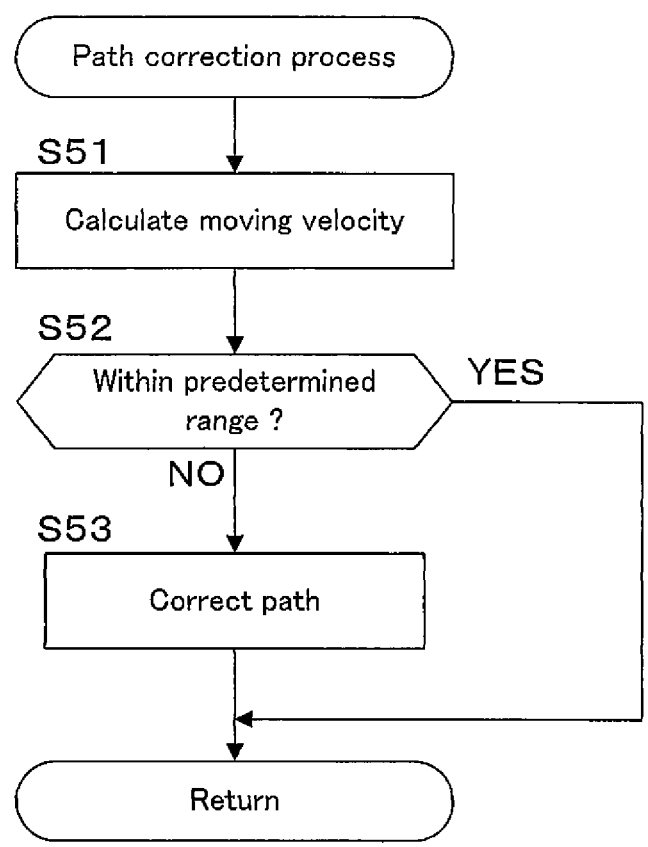
FIG. 12 is a diagram illustrating an example of a flowchart of a path correction process routine.

FIG. 12 is a diagram illustrating an example of a flowchart of a path correction process routine. For example, the path correction process of FIG. 12 may be executed between steps S3 and S4 of the sequence process routine of FIG. 9, that is, after a path is decided by the path deciding process of step S3. When the routine of FIG. 12 starts, in step S51, the control unit 10 first acquires the decided path and an operation timing to be indicated by a target object, and calculates the moving velocity of the object 60 based on the distance of the acquired path and the operation timing. Next, in step S52, it is determined whether or not the moving velocity calculated in step S51 is within a predetermined range. When a positive determination is made in step S52, the subsequent process is skipped, and then the current routine ends. In contrast, when a negative determination is made in step S52, the process proceeds to step S53. In step S53, the decided path is corrected to a path in which the moving velocity of the object 60 falls within the predetermined range, and then the current routine ends. Further, when the path is corrected by the path correction process, in the process of step S4 and subsequent steps of FIG. 9, the path corrected by the path correction process is preferably used in the routine of FIG. 9.

Incidentally, in the routine of FIG. 12, it is determined whether or not the moving velocity is within a predetermined range, but the routine of FIG. 12 may be configured such that the approach angle on the reference portion 55A, 55B, or 55T is calculated as a determination target based on the selected moving path, and then it is determined whether or not the approach angle is within a predetermined range. Further, the routine of FIG. 12 may be configured such that it is determined whether or not the moving velocity is within a predetermined range, and it is determined whether or not the approach angle is within a predetermined range. Furthermore, the routine of FIG. 12 may be configured such that up to a path after a misoperation is calculated, and path correction is performed in view of a moving velocity of an object after a misoperation (for example, the velocity of an operation indication mark until arriving at the end portion 52U or 52B by a misoperation is compared with the velocity of an operation indication mark to appear next at the arrival position of the end portion 52U or 52B, and then the velocity difference is adjusted to fall within a predetermined range).

Further, the routine of FIG. 12 may be applied to an object that has arrived at a reference portion or the like or a next object having a correspondence relation with an object on which an appropriate operation is executed. As a concrete example, a moving path of a next object may be limited to a predetermined path such that the moving velocity of the next object falls within a predetermined range. For example, it is effective when this embodiment is applied to an embodiment in which the specific reference portion is arranged at the position which is farther from the reference portion arranged at the opposite side than from the reference portion arranged at the same end portion side, that is, at the position at which the distance from the reference portion at the opposite side is larger than the distance between the reference portions 55A and 55B, particularly, to an embodiment in which the specific object 60S passing through the specific reference portion does not disappear and moves up to the end portion 52U or 52B. In other words, in this embodiment, the specific reference portion is arranged at a distant position, and thus the moving distance of the specific object 60S is long. For this reason, when a path that is long in a distance by which an object rebounds from the left or right wall twice or more is used as a moving path of a next object, it becomes remarkably fast compared to when a next object appears at another reference portion. Here, when the routine of FIG. 12 is applied to a next object, the moving path of the next object can be limited to a predetermined path such that the moving velocity of the next object falls within a predetermined range. Thus, a path along which an object moves toward the reference portion at the opposite side which is shortest in the distance from the appearance position, a path along which an object moves toward the opposite side at the velocity falling within the predetermined range while rebounding from the left or right wall, or the like can be used as the moving path of the next object without fixing the moving path of the next object. Further, it is effective in not only this embodiment but also an embodiment in which the distance between each of the reference portions 55A and 55B and each of the end portions 52U and 52B is large. The control unit 10 functions as a velocity calculating device by executing the routine of FIG. 12 described above.

In the above-described embodiments, the object 60 disappears at the arrival position, and the arrival position serves as the appearance position of the object 60 corresponding to an operation timing indicated by the common object 60, and thus the object 60 moves as if the object rebounds between the reference portions 55A and 55B, but movement of the object 60 is not limited to this embodiment. For example, an embodiment in which an operation indication mark does not disappear at a rebounding point at the arrival upon each arrival but actually rebounds from the rebounding point directly using a common object 60 may be employed. In this case, for example, the reference portion which the operation indication mark moves toward can be indicated by changing a color of the object to a color corresponding to the reference portion to arrive next after rebounding from the rebounding point.

In the above embodiment, a rectangular region is used as the game region 52, but the present invention is not limited to this embodiment. Regions of various shapes such as a polygonal shape or a circular shape may be used as the game region. Further, in the above embodiment, the two reference portions 55A and 55B corresponding to both ends of the game region 52 in the longitudinal direction are provided, but the number of reference portions is not limited to two. For example, a region around which three or more reference portions are set to allow three or more players to play a game may be used as the game region.

In the above embodiment, the control unit 10 serving as the evaluating device evaluates an operation timing of a touch operation by comparing the operation timing of the touch operation with an operation timing described in the sequence data, but the control unit 10 need not necessarily have the function of the evaluating device. In this case, a game machine of a match-up type in which an operation is made in tune with a rhythm of music while inducing an opponent player to make a mistake can be actualized.

In the above-described embodiments, the touch panel is used as the input device, but the input device is not limited to this embodiment. For example, as far as a plurality of operating units are included, there may be used input devices having various configurations such as a controller including a plurality of push buttons as an operating unit or a plurality of controllers including one button as an operating unit. For example, when a direction selection button and an operation decision button are provided in an input device, the operation decision button may be provided so as to correspond to each reference portion, and a moving path of an operation indication mark used for movement to a next reference portion may be selected by the direction selection button.

In the above-described embodiments, only one game machine 1 is illustrated in FIG. 1, but a plurality of game machines 1 may be connected to share game content with each other. For example, two game machines 1 connected to share game content may be arranged in parallel in the traverse direction. Further, for example, two game machines 1 connected to share game content may be arranged such that back surfaces thereof encounter each other, that is, two game machines may be arranged in a back-to-back manner. In this case, a game is executed in a state in which the players are positioned to face each other, each player's feeling that they are playing against each other can be further improved. Further, in the above-described embodiments, the monitor 3 is arranged to be inclined to the player P side, but the present invention is not limited to this example. For example, the monitor may be arranged to be almost level. In this case, two players can use one monitor, and two players can use the first reference portion and the second reference portion as a plurality of operating units through a common monitor and a common touch panel.

In the above-described embodiments, a game of a match-up type is executed by the game machine 1, but a game executed by the game machine 1 is not limited to a game of a match-up type. For example, a game of the game machine 1 may be executed such that only the first reference portion 55A is set to correspond to an operating unit, but the second reference portion 55B is arranged to simply function as a wall that causes an operation indication mark to rebound. And, a game may be executed such that an operation indication mark rebounds from the second reference portion 55B and both walls 52L and 52R, and moves so as to arrive at only the first reference portion 55A or the first reference portion 55A and the second reference portion 55B at a timing described in the sequence data. Furthermore, in this game, an operation indication mark is configured so as to rebound from the upper end portion 52U, and in this case, a display of the second reference portion 55B may be omitted. In this case, a game, in which a difficulty level of a game can be variously changed, which can be executed by a single player, can be actualized. Further, in this case, the first reference portion 55A and the second reference portion 55B, each wall, or the like function as a plurality of reference portions of the present invention.

In the above-described embodiments, the game machine 1 is configured as a music game machine in which music is reproduced, and an operation indication mark moves toward a reference portion based on a played time of the music. However, the invention is not limited to this example. The game machine 1 can execute various kinds of games as far as an operation timing is indicated through a video. Furthermore, the game system of the invention may be actualized in appropriate embodiments such as a game machine for business use installed in commercial facility, a stationary game machine for home use, a portable game machine, or a game system actualized using a network.

What is claimed is:
1. A game system comprising:
a display device that displays and outputs a game screen;
an input device including at least one operating unit;
a sequence data storage device that stores sequence data in which an operation timing of the operating unit during a game is described together with information associated with each operation timing in advance;
a game region presenting device implemented by a processing unit and configured to cause a game region in which a plurality of reference portions arranged apart from each other are set to be displayed on the game screen;
a mark display control device implemented by the processing unit and configured to display each operation indication mark for indicating an operation on the operating unit such that the operation indication mark reaches the at least one of the plurality of reference portions along any one of a plurality of paths connecting the reference portions at an operation timing indicated by the sequence data, and a next operation indication mark having a correspondence relation with a certain operation indication mark moves along a path continuously connected with a moving path of the certain operation indication mark among the plurality of paths based on information described in the sequence data;
a position change device implemented by the processing unit and configured to cause the certain operation indication mark to disappear from the game screen after the operation timing elapses and changes the moving path of the next operation indication mark from the path continuously connected with the moving path of the certain operation indication mark to another path extending from a predetermined position when a predetermined condition is satisfied; and
a velocity calculating device implemented by the processing unit and configured to calculate a moving velocity of the operation indication mark based on a distance from an appearance position of the operation indication mark set in the game screen to an arrival position and an operation timing indicated in the sequence data, and wherein
the position change device determines whether or not the predetermined condition has been satisfied based on the moving velocity of the certain operation indication mark calculated by the velocity calculating device.
2. The game system according to claim 1, wherein the position change device determines that the predetermined condition has been satisfied when the moving velocity of the certain operation indication mark calculated by the velocity calculating device does not fall within a predetermined range.

3. The game system according to claim 1, wherein the position change device determines that the predetermined condition has been satisfied when a velocity difference between the moving velocity of the certain operation indication mark calculated by the velocity calculating device and the moving velocity of the next operation indication mark exceeds a predetermined range.

4. The game system according to claim 1, wherein the game region presenting device causes a game region, in which there is a predetermined distance between the plurality of reference portions and at least one specific reference portion is set as a part of the plurality of reference portions at a position at which a distance between the position and other reference portions is different from the predetermined distance, to be displayed on the game screen as the game region, and
the position change device determines whether or not the predetermined condition has been satisfied based on a specific operation indication mark that moves so as to arrive at the specific reference portion among the plurality of reference portions at the operation timing indicated by the sequence data.

5. The game system according to claim 4, wherein the game region presenting device causes a game region, in which the specific reference portion is set at a position at which a distance from at least one reference portion of the plurality of reference portions is closer than a distance from reference portions other than the one reference portion, to be displayed on the game screen as the game region.

6. The game system according to claim 5, wherein the game region presenting device causes a game region, in which the specific reference portion is set as the closer position at a position at which a distance from at least one other reference portion excluding a reference portion arranged at the closer position is shorter than the predetermined distance, to be displayed on the game screen as the game region.

7. The game system according to claim 5, wherein the position change device uses an inside of a region formed between the specific reference portion and the reference portion arranged at the closer position as the predetermined position.

8. The game system according to claim 4, wherein the position change device determines that the predetermined condition has been satisfied when the specific operation indication mark is displayed as the certain operation indication mark and an operation has not been executed on the operating unit within a certain range based on an operation timing to be indicated by the specific operation indication mark.

9. The game system according to claim 1, wherein the game region presenting device causes a region, which is formed in the form of a quadrangle and includes two reference portions extending in the form of a straight line which are set at both one ends of the quadrangle so as to face each other, to be displayed on the game screen as the game region.

10. The game system according to claim 1, wherein a touch panel arranged on the display device so as to cover the game region is used as the input device.

11. The game system according to claim 1, further comprising an evaluating device implemented by the processing unit and configured to evaluate an operation in at least one of the plurality of reference portions based on a timing of an operation on the operating unit and an operation timing designated by the sequence data.

12. The game system according to claim 1, further comprising:
an audio output device implemented by the processing unit and configured to reproduce and output a sound;
a music data storage device implemented by the processing unit and configured to store music data used to reproduce music; and
a music reproducing device implemented by the processing unit and configured to reproduce the music through the audio output device based on the music data, and wherein
an operation timing of the operating units during reproduction of the music is described in the sequence data.

13. A control method of controlling a computer incorporated into a game system comprising:
a display device that displays and outputs a game screen;
an input device including at least one operating unit; and
a sequence data storage device that stores sequence data in which an operation timing of the operating unit during a game is described together with information associated with each operation timing in advance, and wherein the control method of controlling the computer comprises the steps:
causing, by a game region presenting device implemented by a processing unit, a game region in which a plurality of reference portions arranged apart from each other are set to be displayed on the game screen,
displaying, by a mark display control device implemented by the processing unit, each operation indication mark for indicating an operation on the operating unit such that the operation indication mark reaches the at least one of the plurality of reference portions along any one of a plurality of paths connecting the reference portions at an operation timing indicated by the sequence data, and a next operation indication mark having a correspondence relation with a certain operation indication mark moves along a path continuously connected with a moving path of the certain operation indication mark among the plurality of paths based on information described in the sequence data,
causing, by a position change device implemented by the processing unit, the certain operation indication mark to disappear from the game screen after the operation timing elapses and changes the moving path of the next operation indication mark from the path continuously connected with the moving path of the certain operation indication mark to another path extending from a predetermined position when a predetermined condition is satisfied, and
calculating, by a velocity calculating device implemented by the processing unit, a moving velocity of the operation indication mark based on a distance from an appearance position of the operation indication mark set in the game screen to an arrival position and an operation timing indicated in the sequence data, and wherein
the position change device determines whether or not the predetermined condition has been satisfied based on the moving velocity of the certain operation indication mark calculated by the velocity calculating device.

14. A non-transitory computer readable storage medium storing a computer program for a game system comprising:
a display device that displays and outputs a game screen;

an input device including at least one operating unit; and
a sequence data storage device that stores sequence data in which an operation timing of the operating unit during a game is described together with information associated with each operation timing in advance, and wherein the computer program is configured so as to cause a computer incorporated into the game system to function as:
a game region presenting device implemented by a processing unit configured to cause a game region in which a plurality of reference portions arranged apart from each other are set to be displayed on the game screen,
a mark display control device implemented by the processing unit configured to display each operation indication mark for indicating an operation on the operating unit such that the operation indication mark reaches the at least one of the plurality of reference portions along any one of a plurality of paths connecting the reference portions at an operation timing indicated by the sequence data, and a next operation indication mark having a correspondence relation with a certain operation indication mark moves along a path continuously connected with a moving path of the certain operation indication mark among the plurality of paths based on information described in the sequence data,
a position change device implemented by the processing unit and configured to cause the certain operation indication mark to disappear from the game screen after the operation timing elapses and changes the moving path of the next operation indication mark from the path continuously connected with the moving path of the certain operation indication mark to another path extending from a predetermined position when a predetermined condition is satisfied, and
a velocity calculating device implemented by the processing unit and configured to calculate a moving velocity of the operation indication mark based on a distance from an appearance position of the operation indication mark set in the game screen to an arrival position and an operation timing indicated in the sequence data, and wherein
the position change device determines whether or not the predetermined condition has been satisfied based on the moving velocity of the certain operation indication mark calculated by the velocity calculating device.

* * * * *